Figure 1:
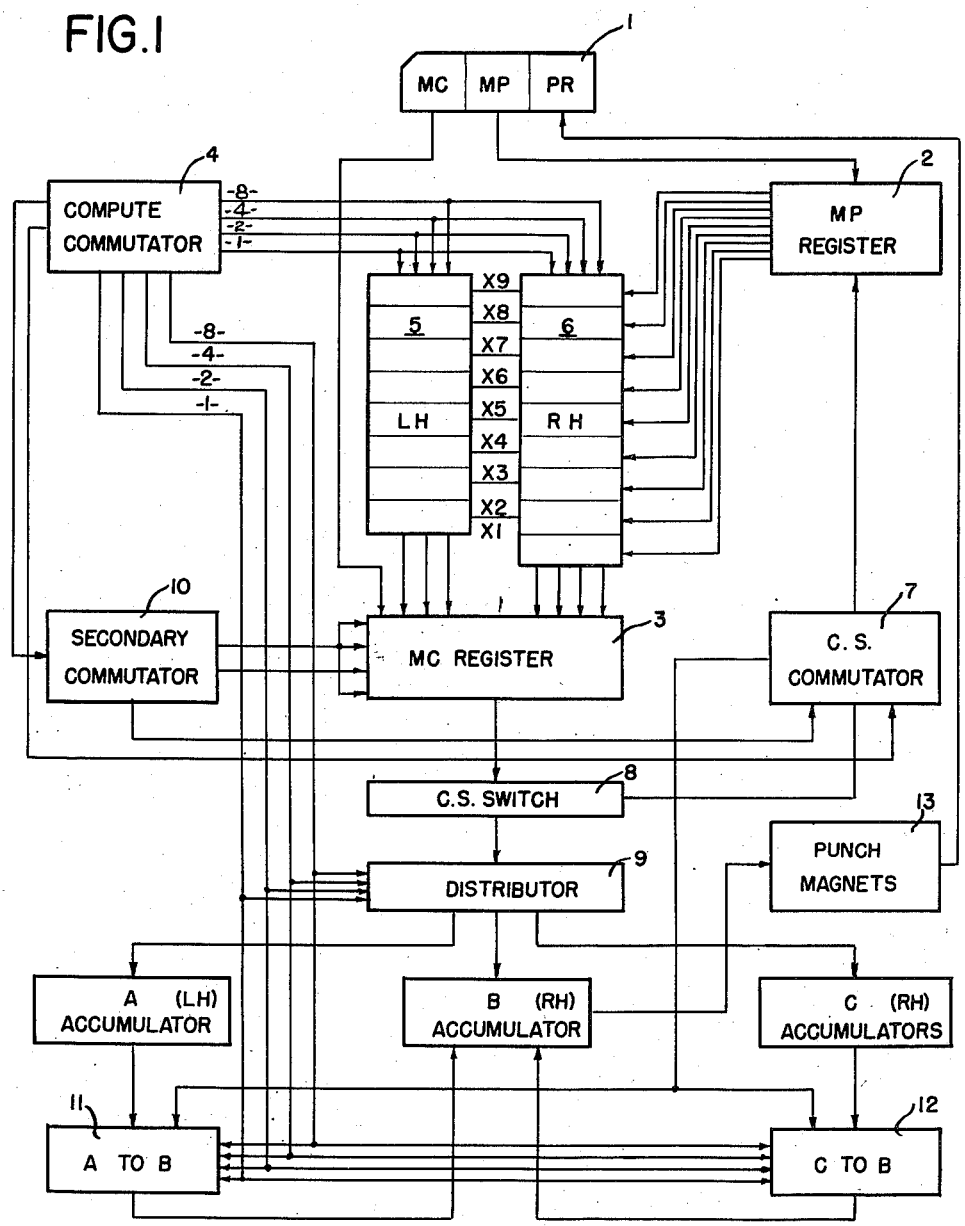
Figure 2A:
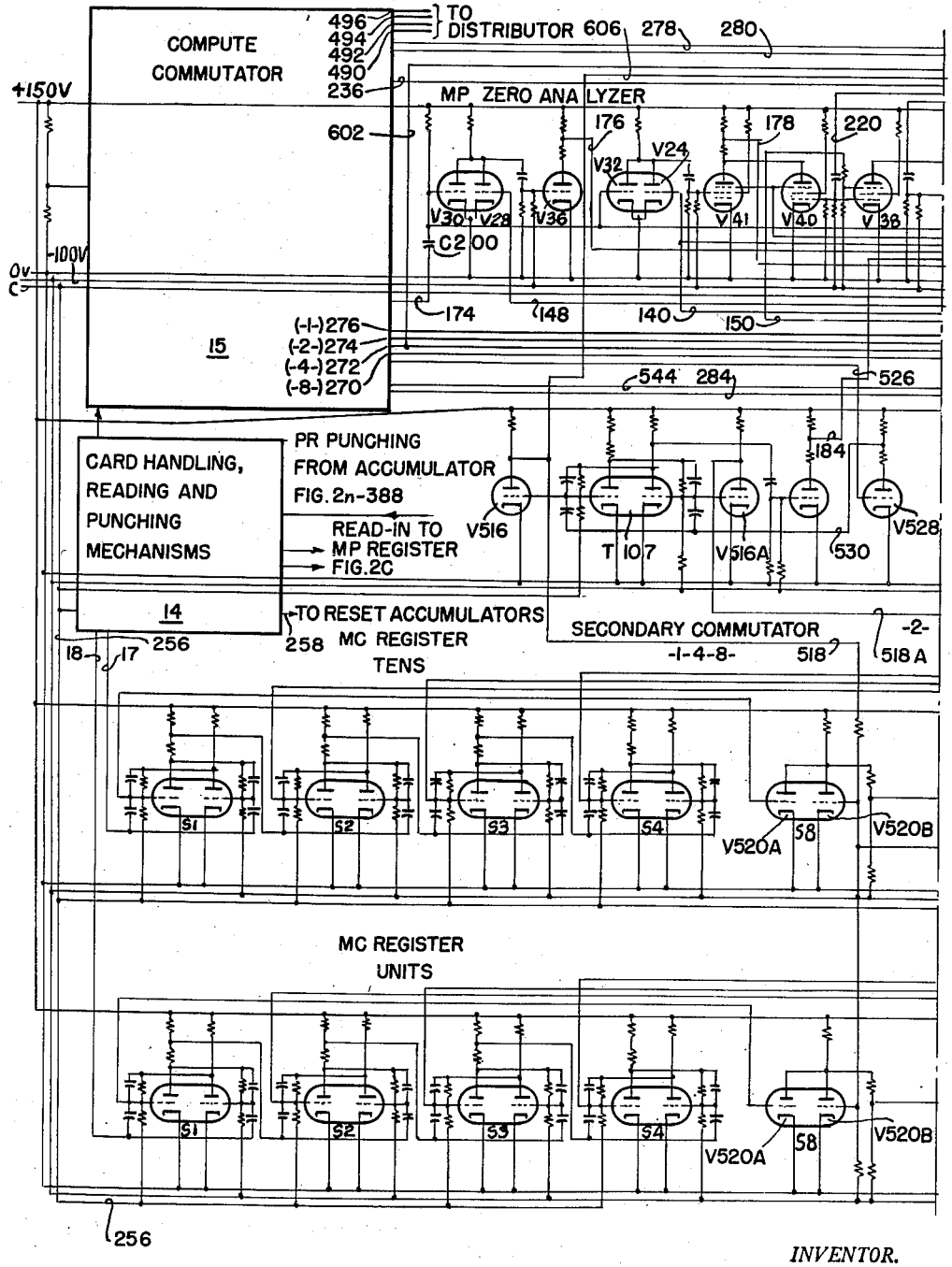
Figure 2B:
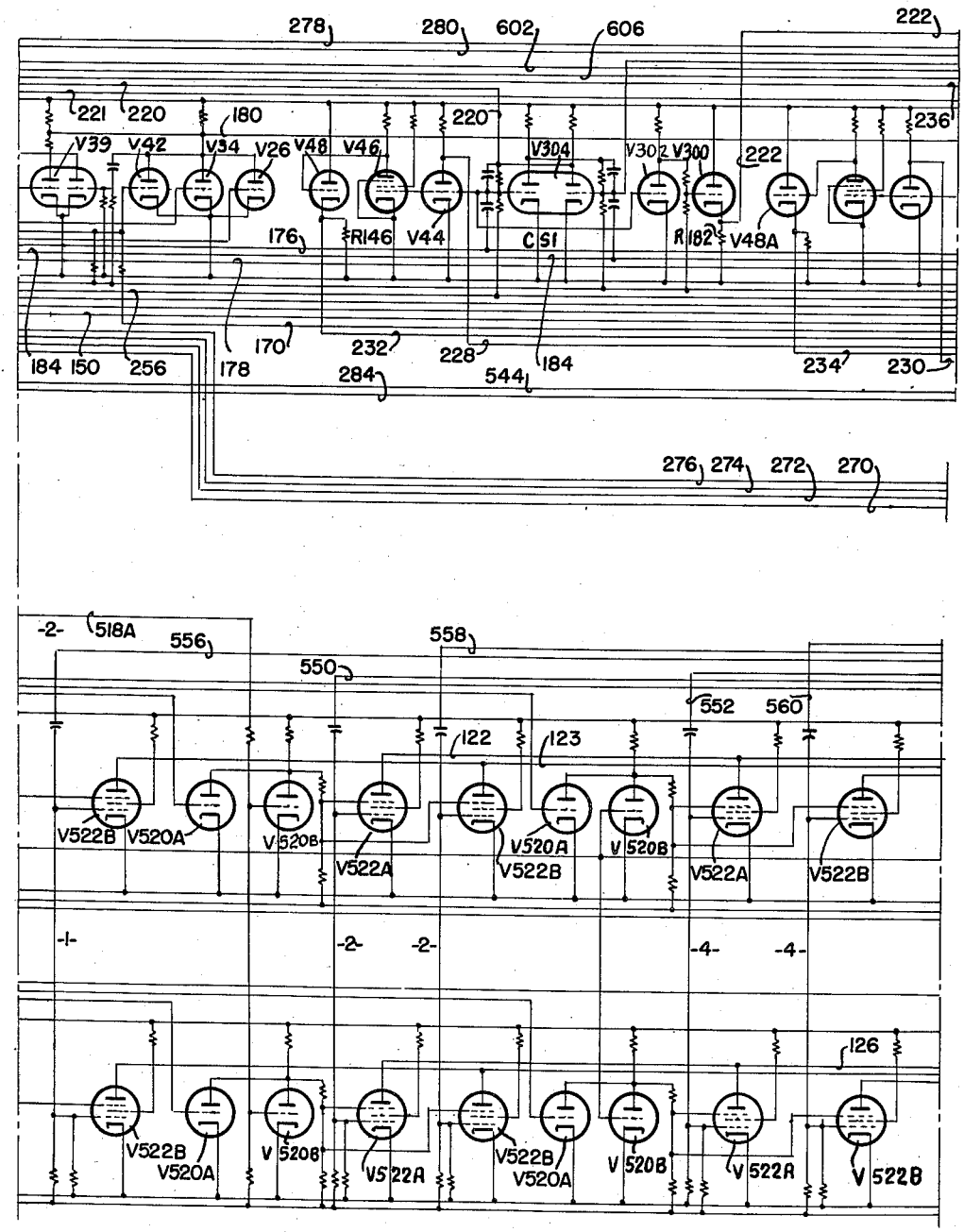
Figure 2C:
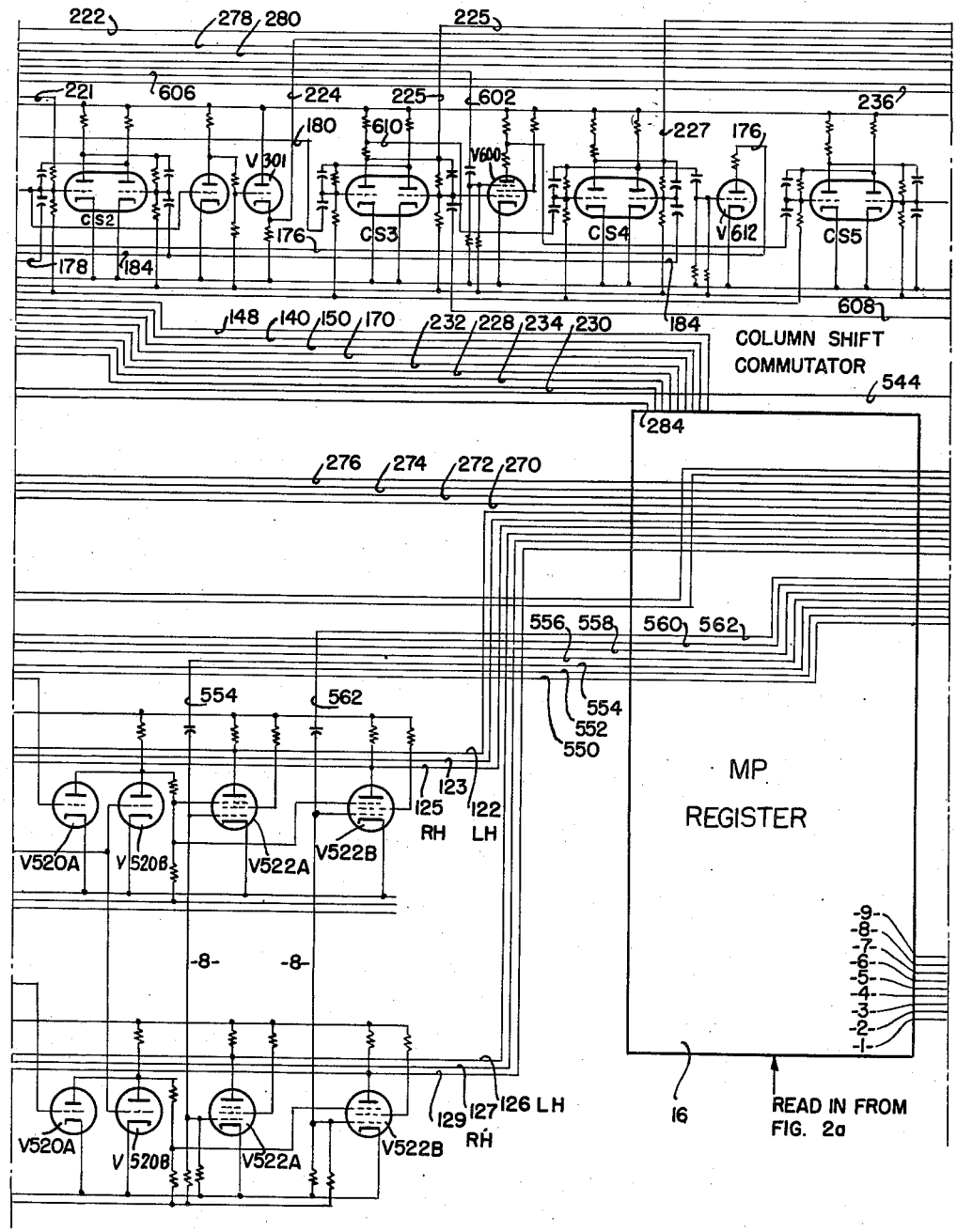
Figure 2E:
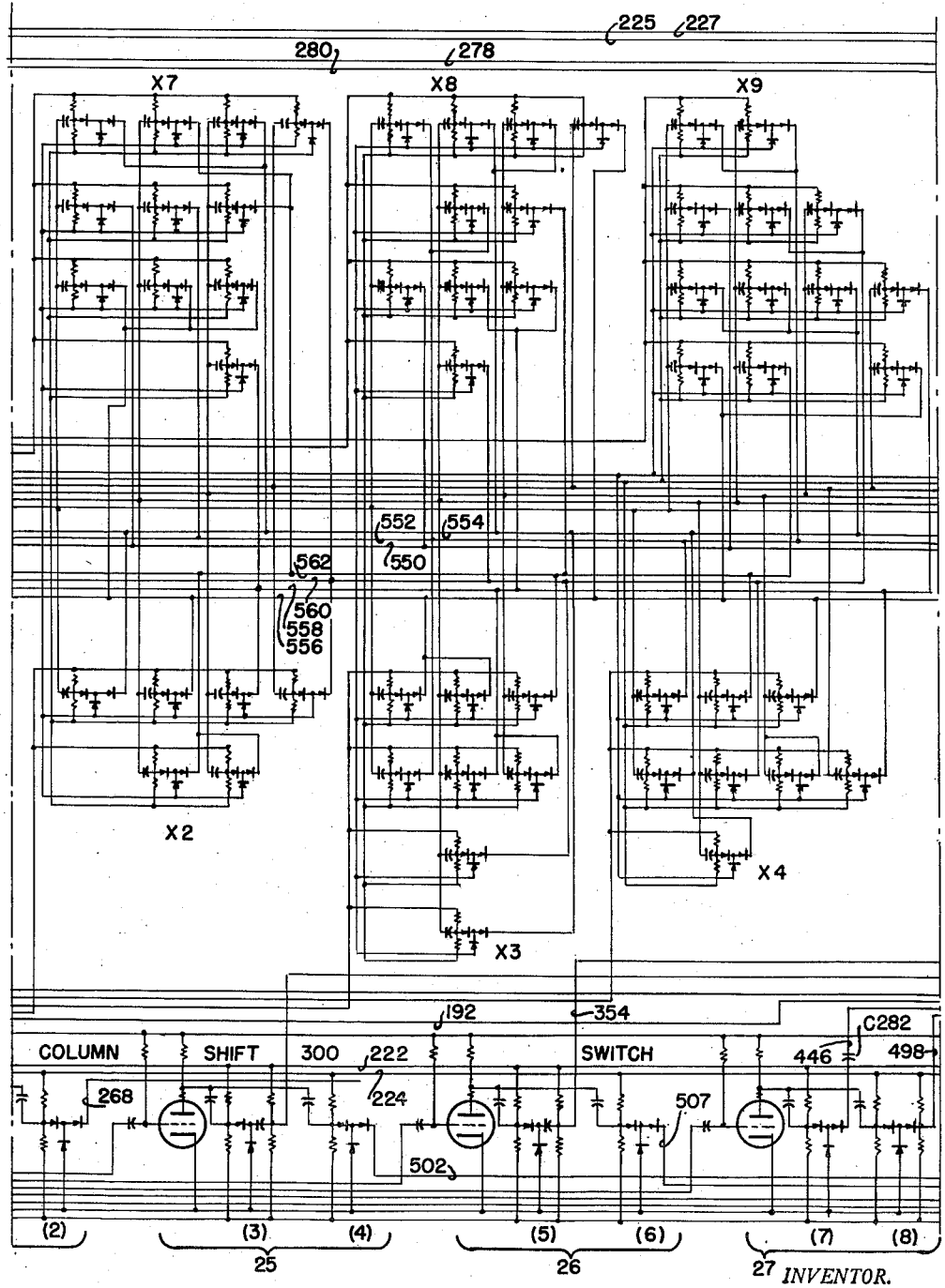
Figure 2F:
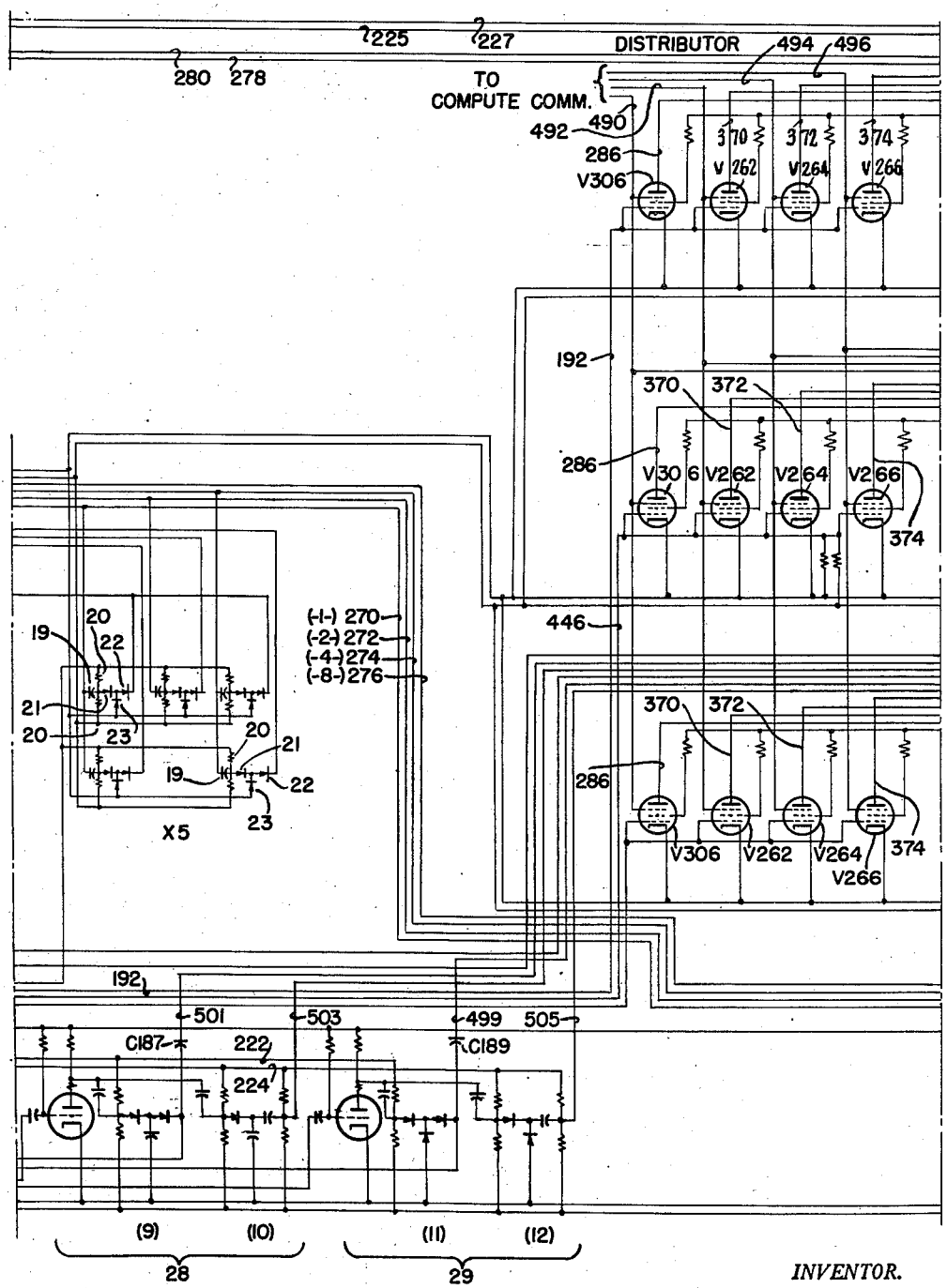
Figure 2G:
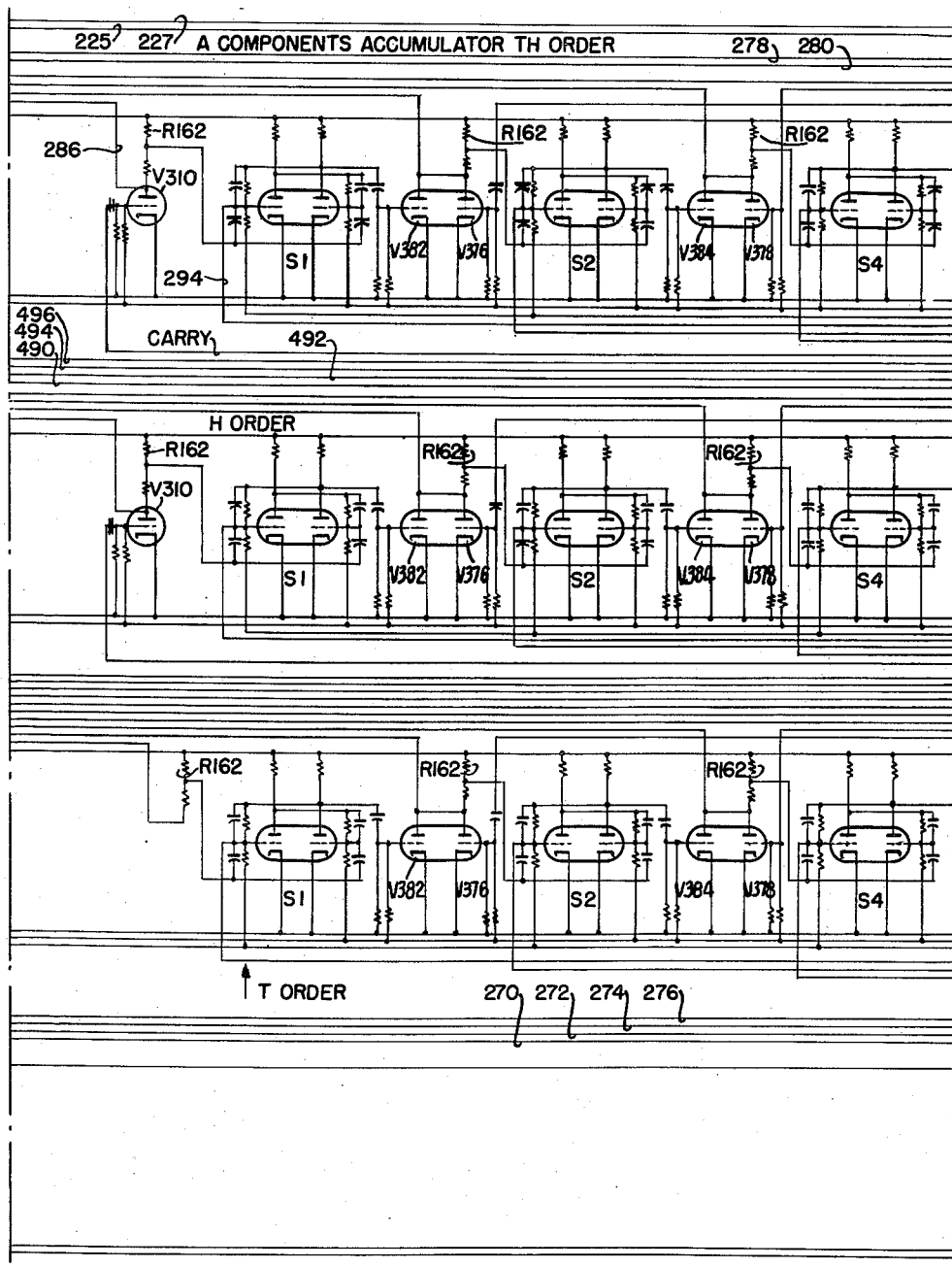
Figure 2H:
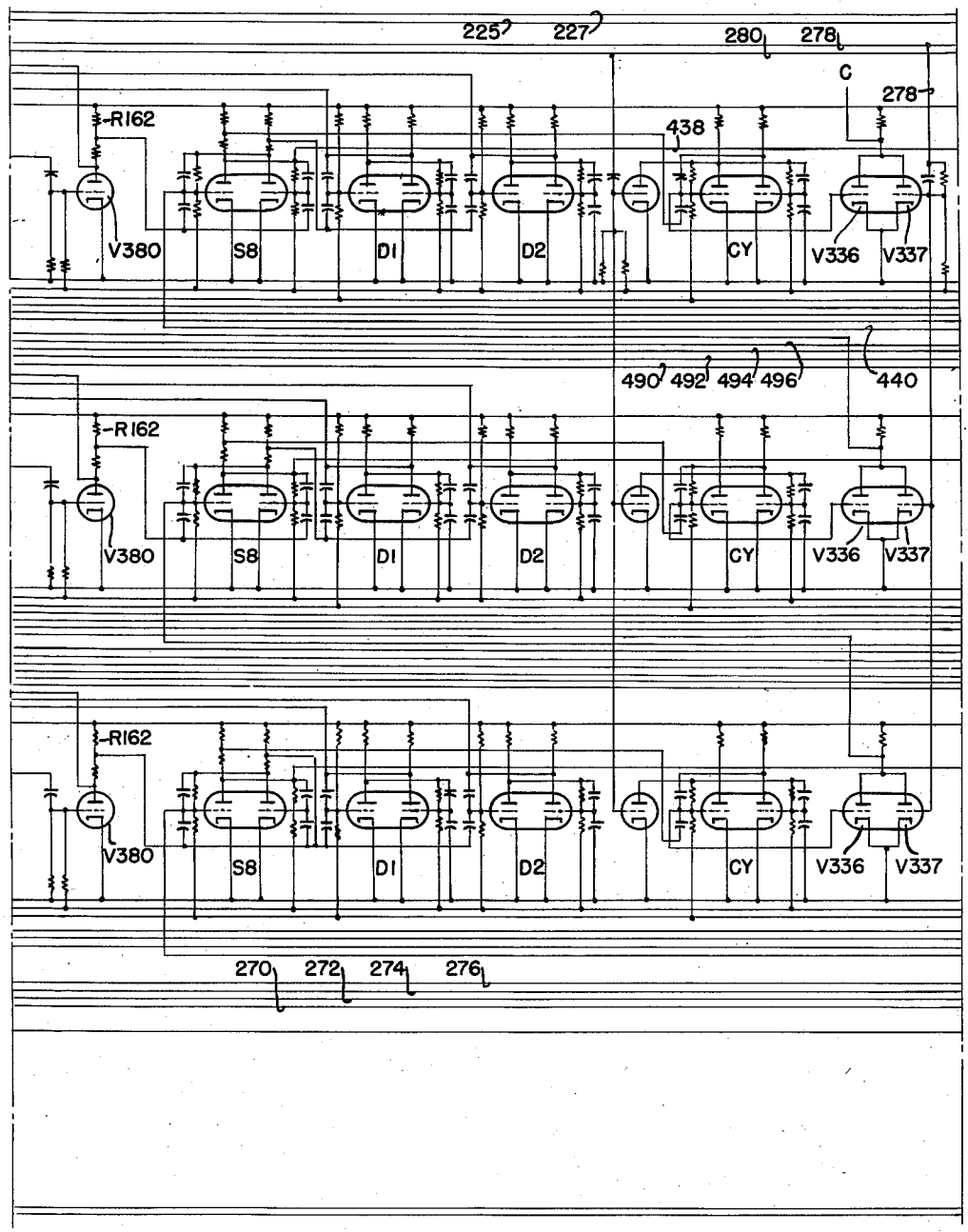
Figure 2J:
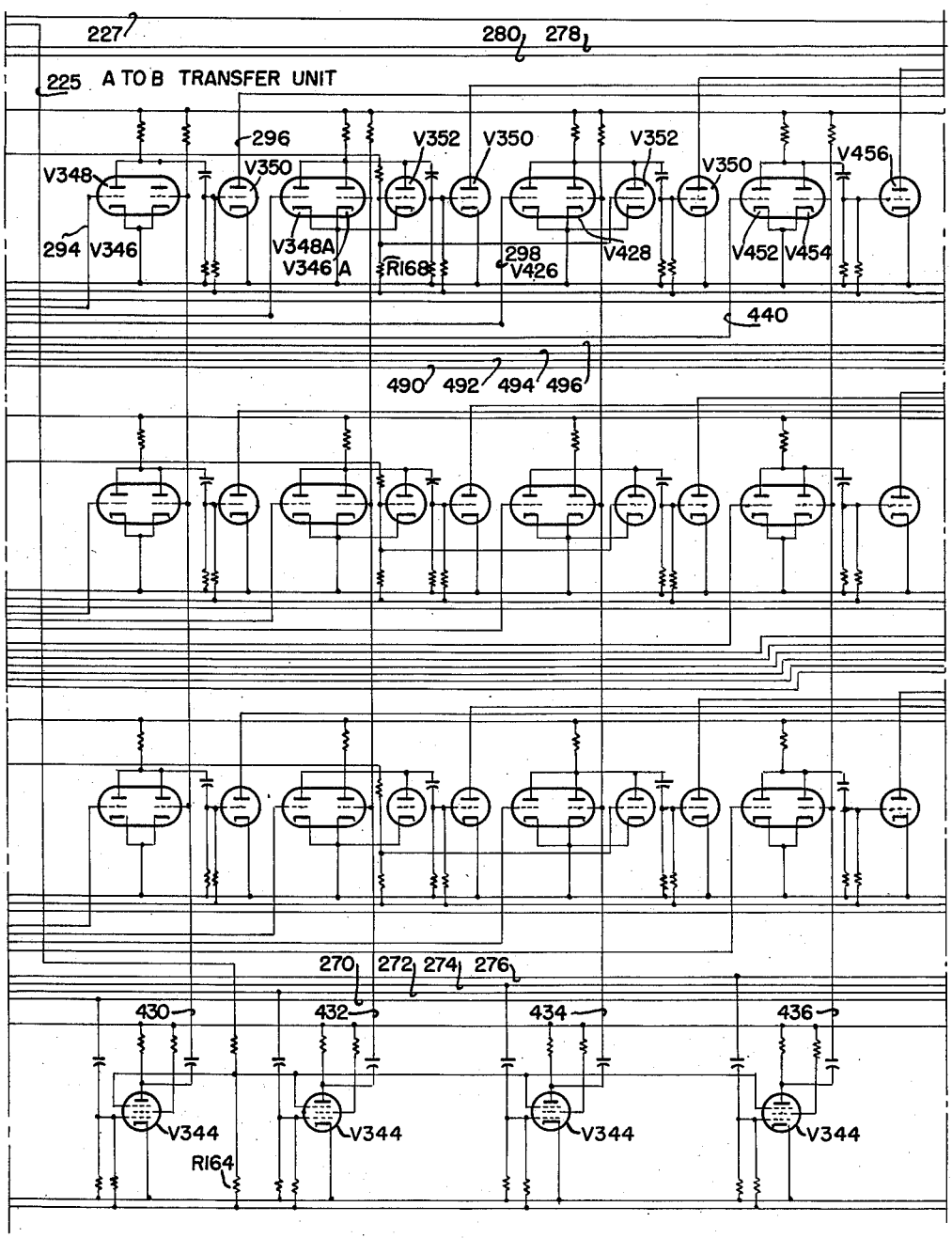
Figure 2K:
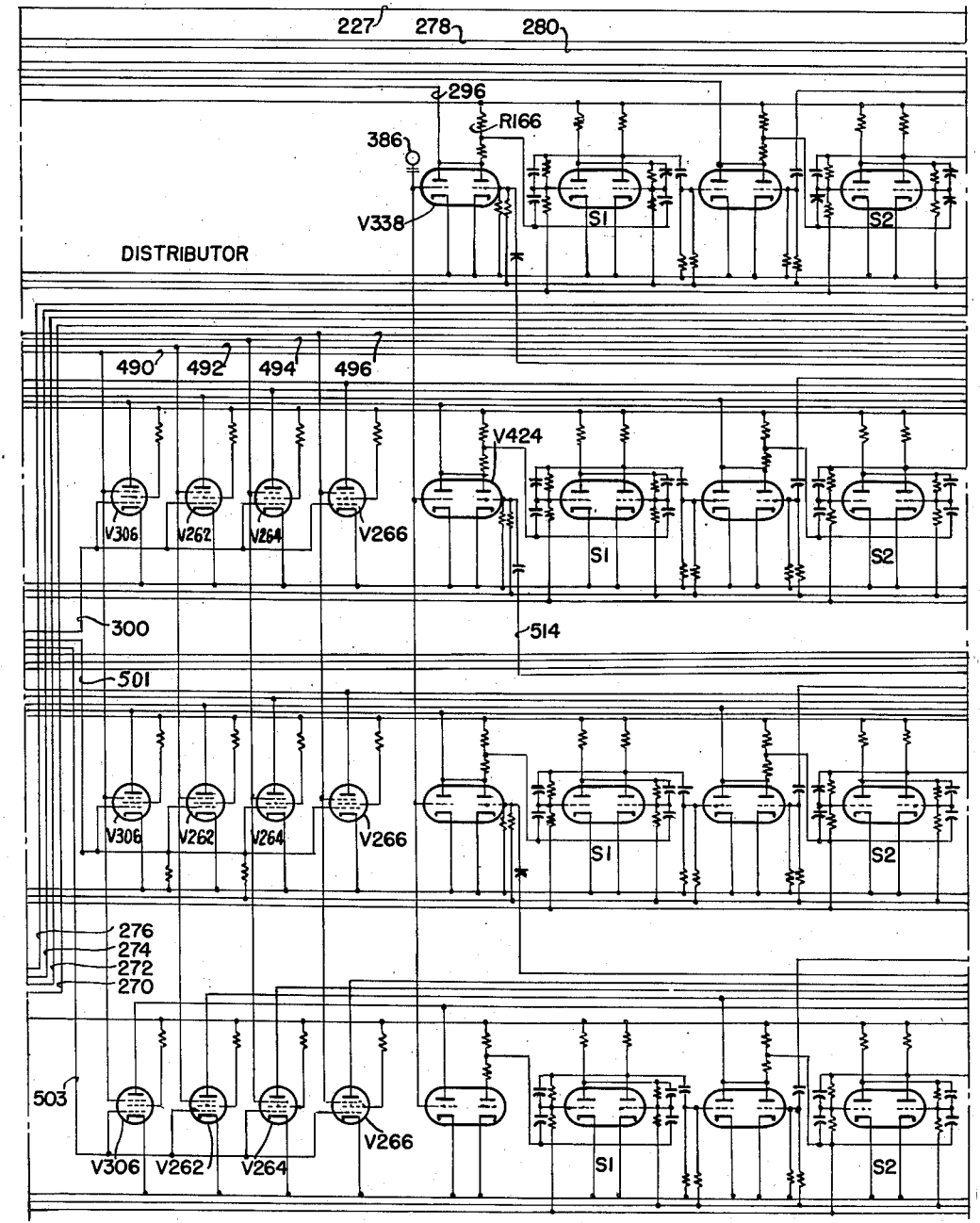
Figure 2M:
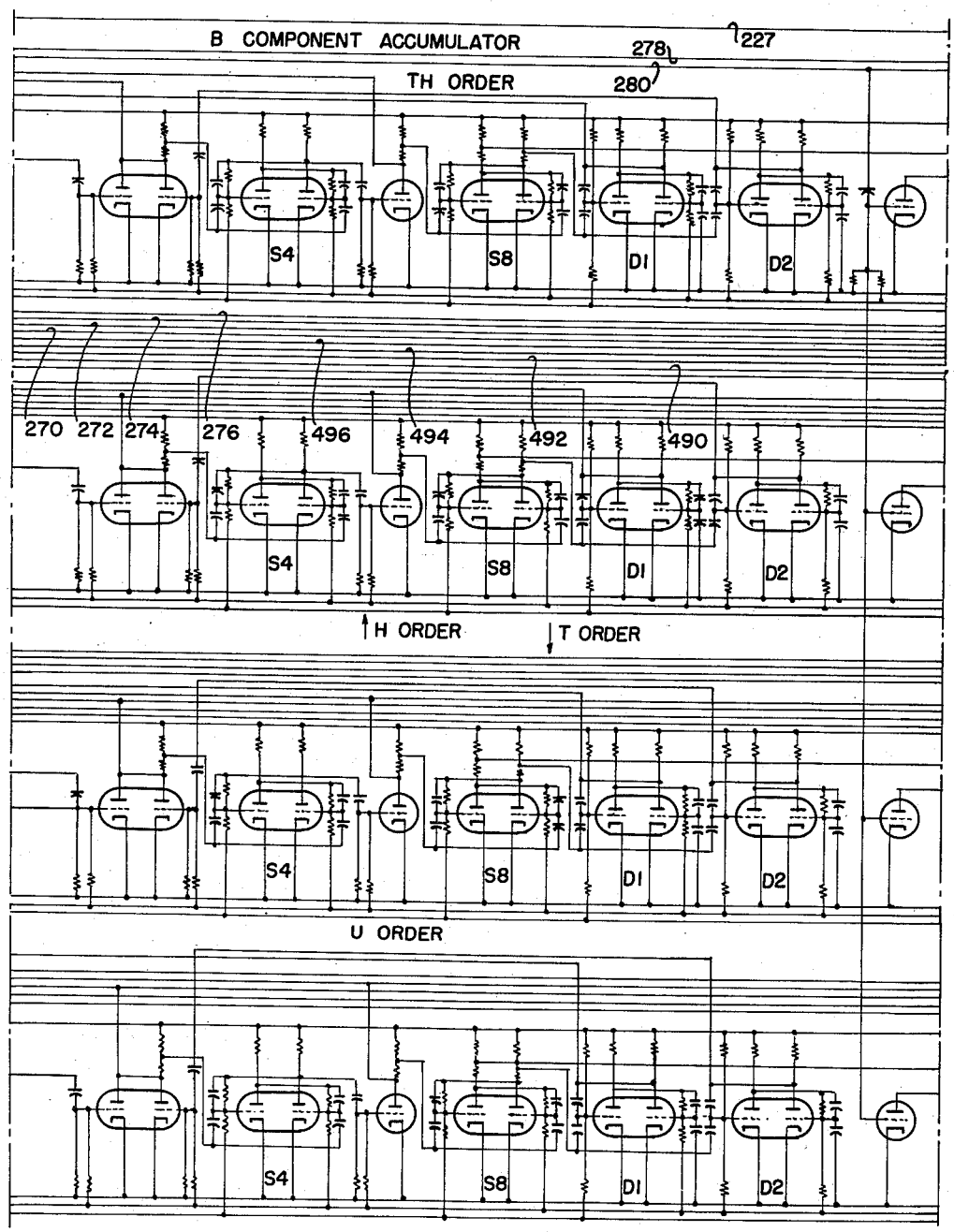
Figure 2N:
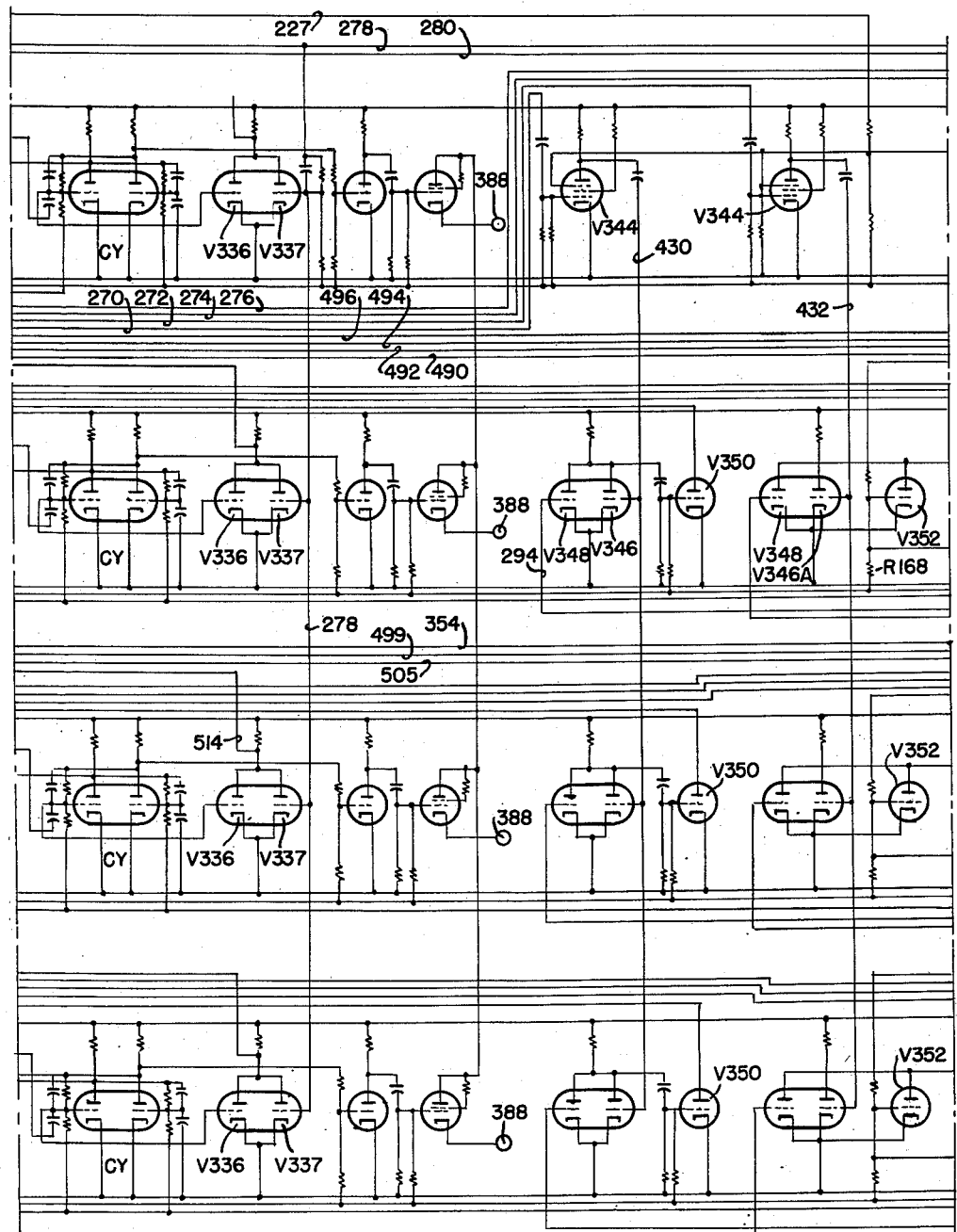
Figure 20:
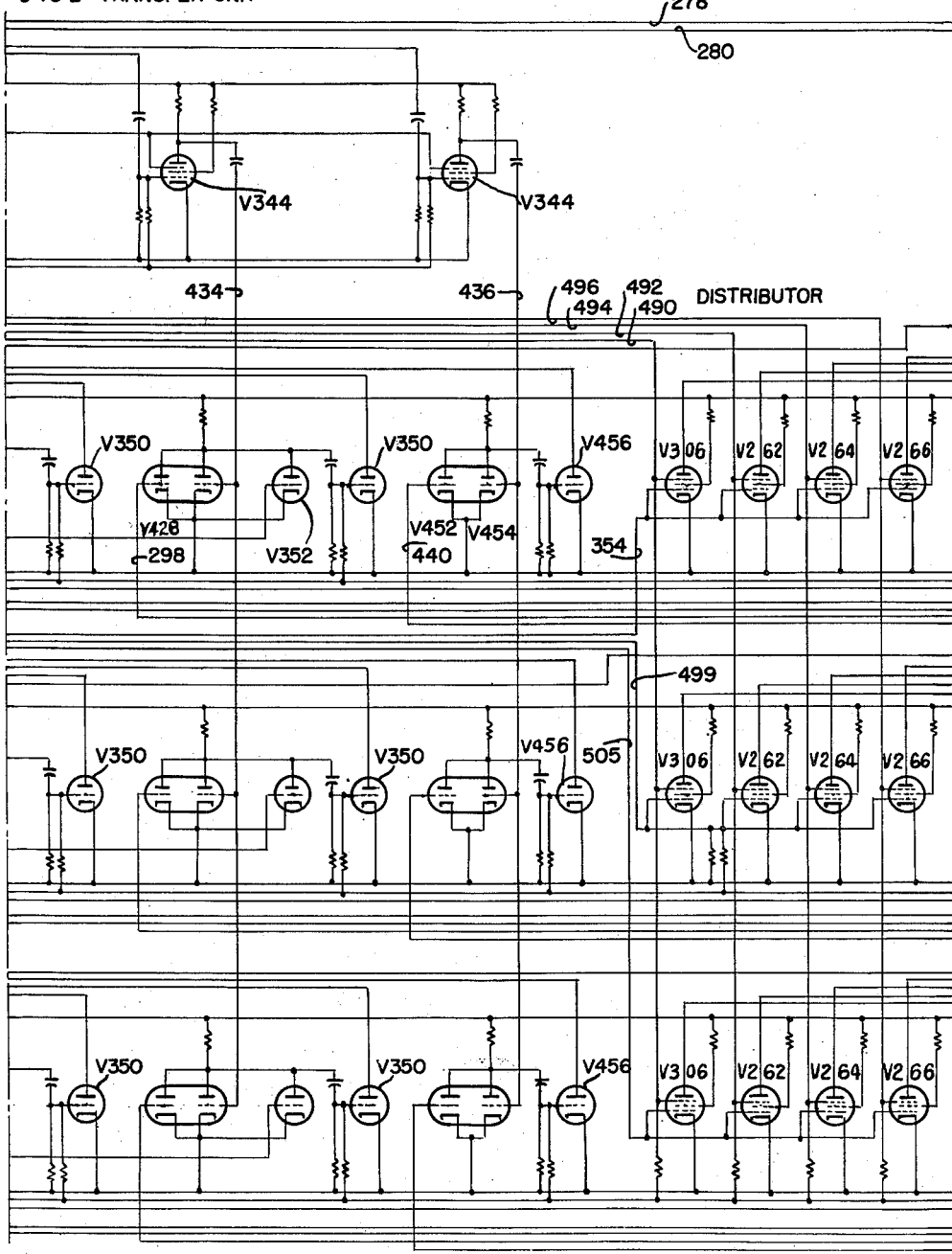
Figure 2P:
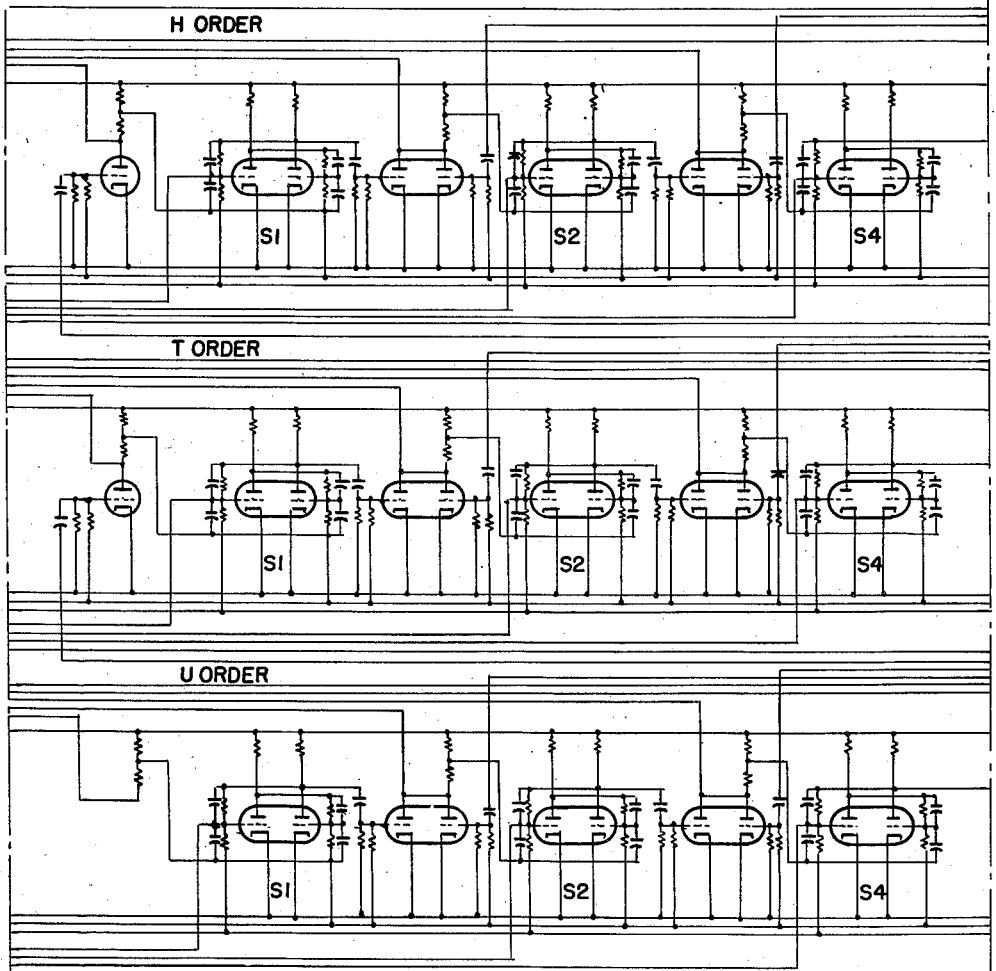
Figure 2Q:
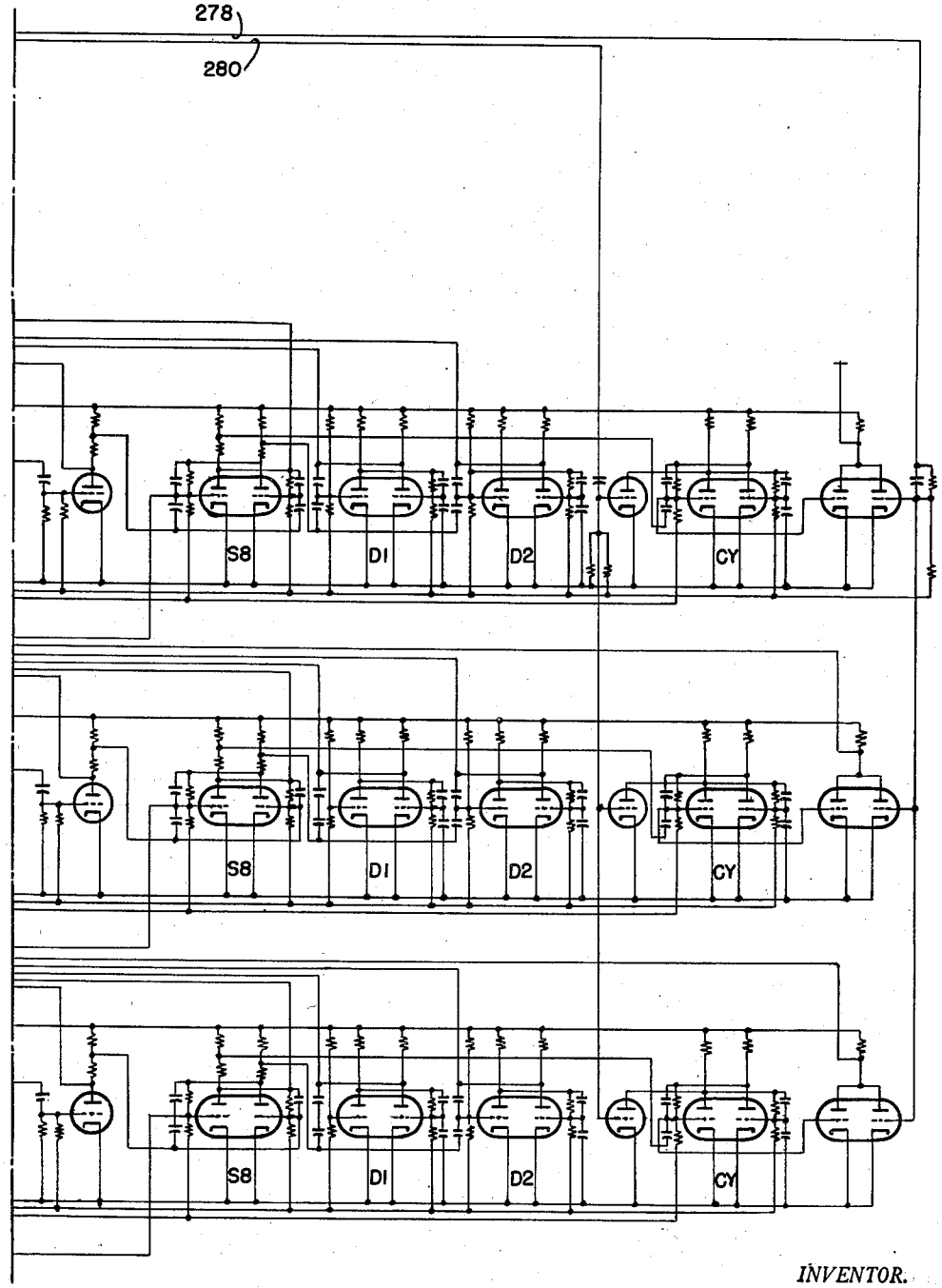

April 8, 1958     C. A. BERGFORS     2,829,827
ELECTRONIC MULTIPLYING MACHINE
Filed March 1, 1954     19 Sheets-Sheet 1

INVENTOR.
CARL A. BERGFORS
BY
ATTORNEYS

April 8, 1958 C. A. BERGFORS 2,829,827
ELECTRONIC MULTIPLYING MACHINE
Filed March 1, 1954 19 Sheets-Sheet 2

INVENTOR.
CARL A BERGFORS
BY
Kenyon & Kenyon
ATTORNEYS

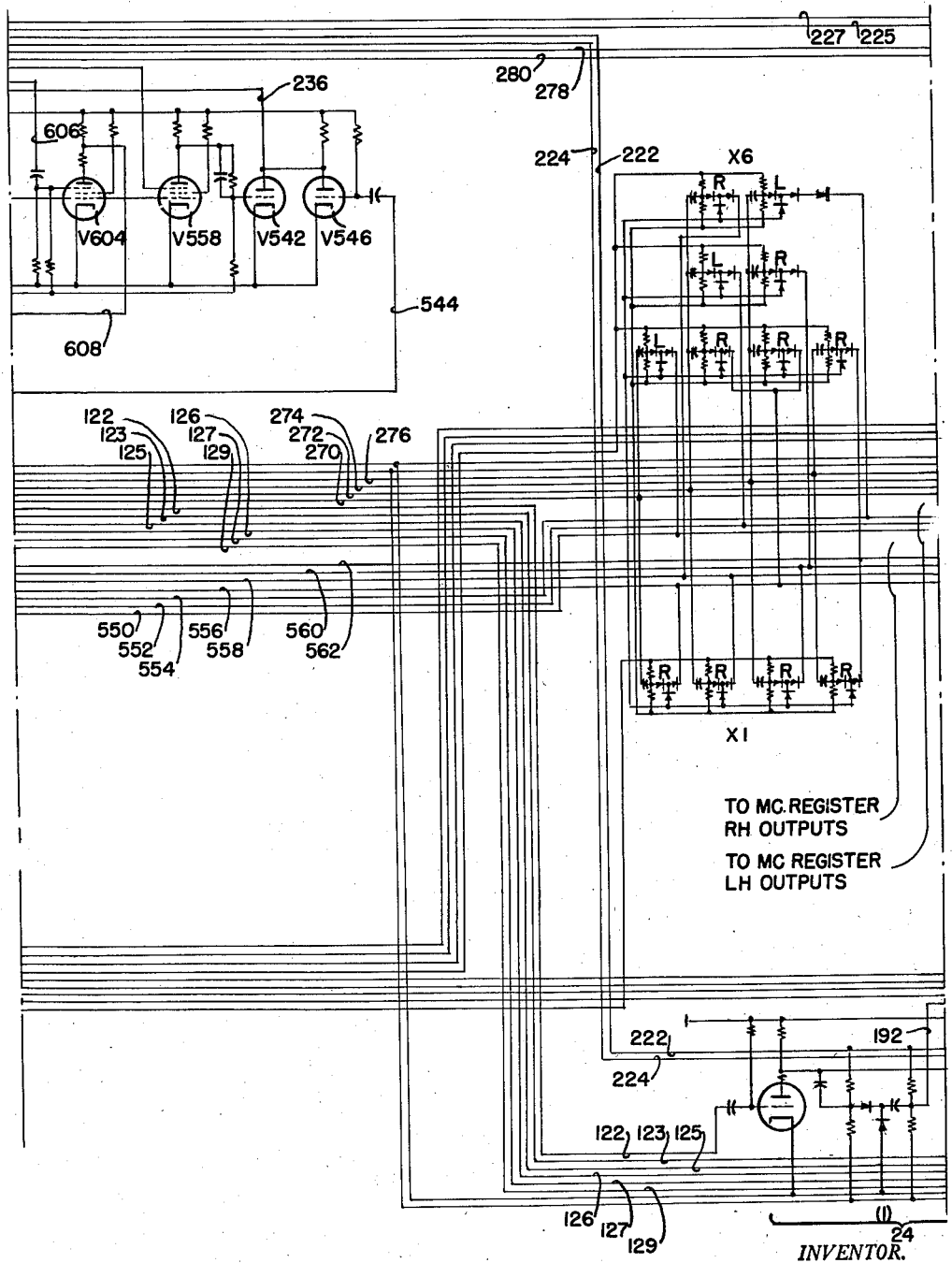

April 8, 1958     C. A. BERGFORS     2,829,827

ELECTRONIC MULTIPLYING MACHINE

Filed March 1, 1954     19 Sheets-Sheet 11

*INVENTOR.*
CARL A. BERGFORS
BY
*Kenyon & Kenyon*
ATTORNEYS

April 8, 1958  C. A. BERGFORS  2,829,827
ELECTRONIC MULTIPLYING MACHINE
Filed March 1, 1954  19 Sheets-Sheet 12

INVENTOR.
CARL A. BERGFORS
BY
ATTORNEYS

April 8, 1958  C. A. BERGFORS  2,829,827
ELECTRONIC MULTIPLYING MACHINE
Filed March 1, 1954  19 Sheets-Sheet 15

INVENTOR.
CARL A. BERGFORS
BY
ATTORNEYS

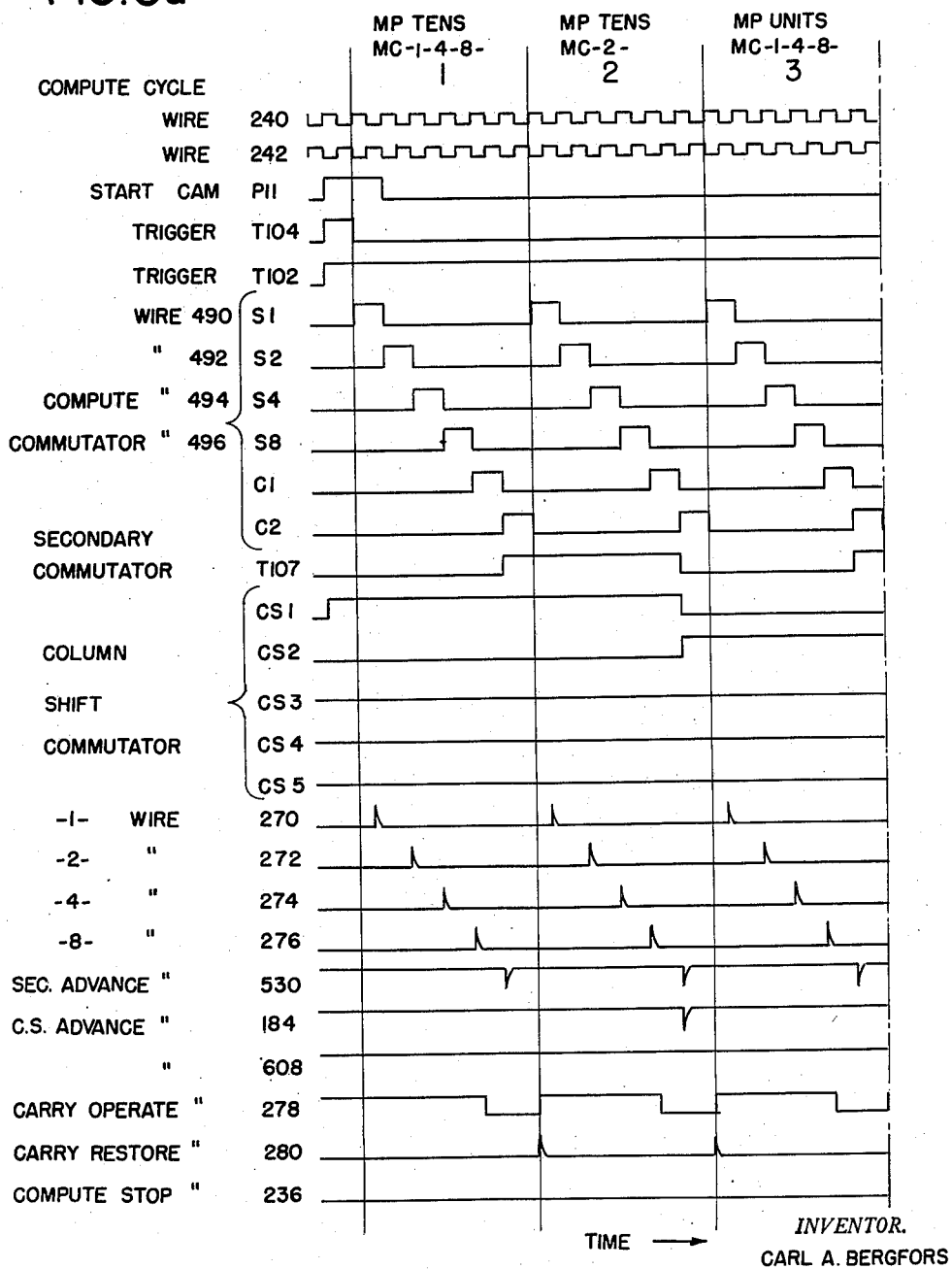

April 8, 1958 C. A. BERGFORS 2,829,827
ELECTRONIC MULTIPLYING MACHINE
Filed March 1, 1954 19 Sheets-Sheet 18

INVENTOR.
CARL A. BERGFORS
BY
ATTORNEYS

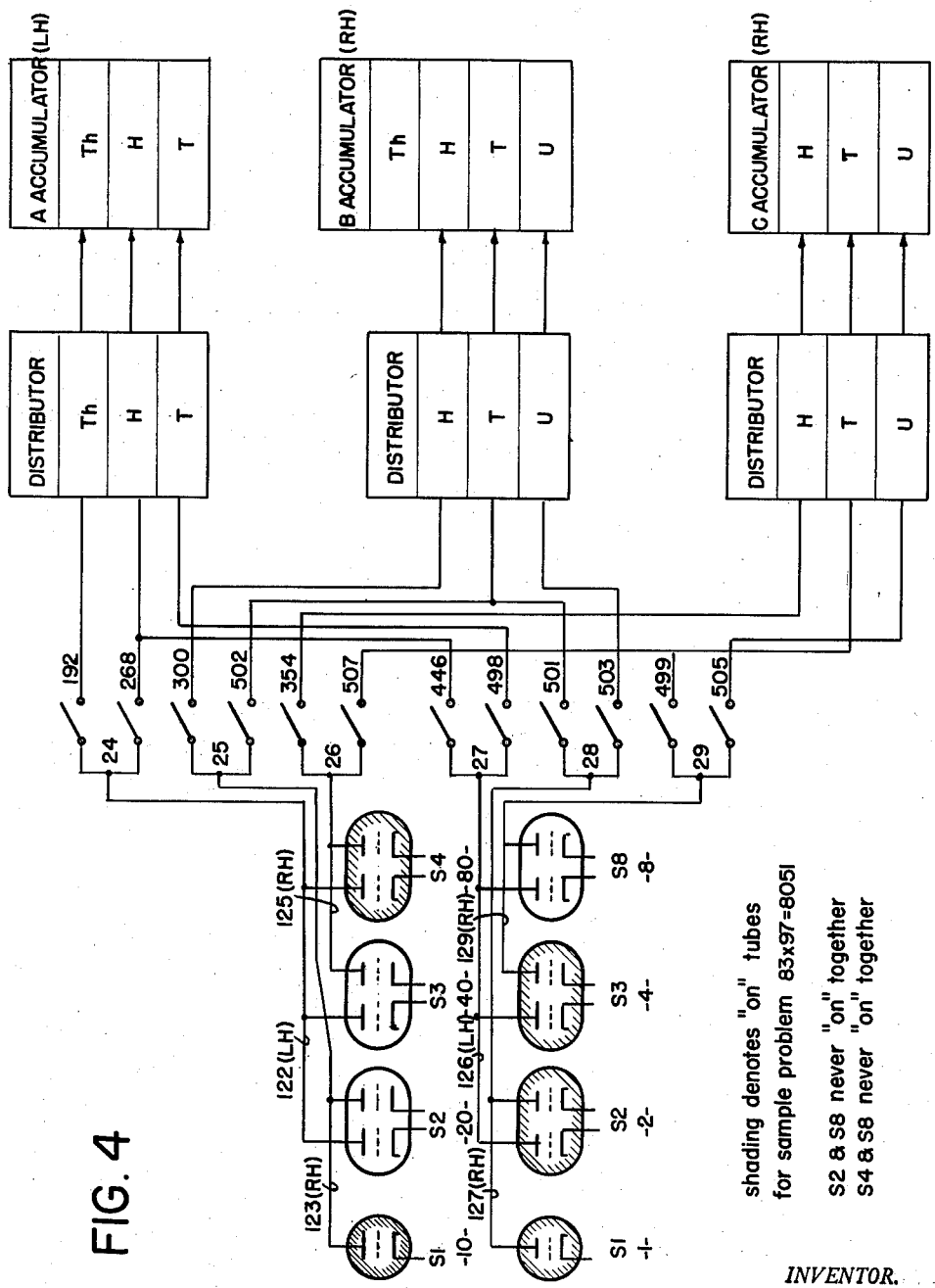

United States Patent Office 2,829,827
Patented Apr. 8, 1958

2,829,827
ELECTRONIC MULTIPLYING MACHINE

Carl A. Bergfors, San Jose, Calif., assignor to International Business Machines Corporation, New York, N. Y., a corporation of New York Application March 1, 1954, Serial No. 413,198

32 Claims. (Cl. 235—61)

It is the object of this invention to provide certain improvements in systems of the kind described and claimed in an application Serial No. 404,157, filed January 15, 1954, by Arthur H. Dickinson and entitled Electronic Multiplying System. The improvement is directed particularly to a practical compromise between the incompatible requirements of speed and circuit simplicity in systems of this kind.

In the Dickinson system, multiplication is effected by controlling the flow of pulses representing binary code components (bits) which can be selected to form all possible products which the system may be required to calculate. This is done by sending the pulses through a partial product matrix constituted by a group of nine multiplying plates one of which is selected by a multiplier (MP) register to have its pulse output filtered by a multiplicand (MC) register which thereby produces the bit components of the product. As in the system of this application, the MP register is in decimal form, i. e., it has a ten stage counter for each of the decimal digits or orders of the MP. The function of this MP register is to choose for operation that multiplier plate which corresponds to the particular MP digit registered for the multiplication problem at hand, and that multiplying plate is constructed so that it will produce all of the bit pulse components necessary to multiply that MP digit by all possible MC values. For simplification of the system, the multiplier plate produces both the LH and RH components of the product or partial product. The pulses produced by the selected multiplier plate are delivered to the MC register, the function of which is to select only those pulse components necessary for the multiplication of the digit registered in the MP register by whatever quantity is registered in the MC register.

The MC register in the Dickinson system is disclosed in two forms; in a first embodiment, it is decimal; and in a second embodiment, it is binary. This means that in the decimal MC register the MC digit can be registered by a single counter tube, but in the binary register it may require a number of tubes depending upon how many binary components or bits are necesasry to form the MC digit involved.

The purpose of the decimal MC register is to afford the system maximum speed in operation; if, as is then the case, only a single counter tube per order is involved in the MC register during multiplication, then multiplication can be effected in one compute cycle per MP digit. The purpose of the binary MC register is simplification of the circuitry; with it the system requires fewer tubes than with the decimal MC register. The simplification is, however, at the expense of speed; with the binary MC register, multiplication requires four compute cycles per MP digit. The reason for the latter slower operation is that where the MC is indicated by several tubes in the MC register the system offers the possibility of confusion between simultaneously occurring pulses unless four compute cycles per MP digit are used, i. e., some of the bit pulses which should be counted separately will, in fact, be counted together so that the system may register only −1− when it should register −2− or more. The use of the four compute cycles displaces all such pulses in time so as to avoid any possibility of their conflicting with each other.

In the present system, it has been found possible to displace potentially conflicting pulses of the latter type spacially, as an alternative or supplement to a displacement in time. This spacial displacement is accomplished by sending pulses to additional component accumulators, i. e., whereas the Dickinson system used only two product accumulators, the present system uses three or more. The net result is a compromise between the speedier principal embodiment of the Dickinson system and the slower but structurally simpler modification with the binary MC register. The present system is less complicated in circuit arrangements than the principal embodiment but faster than the modification in that it uses fewer compute cycles.

Figure 3B:
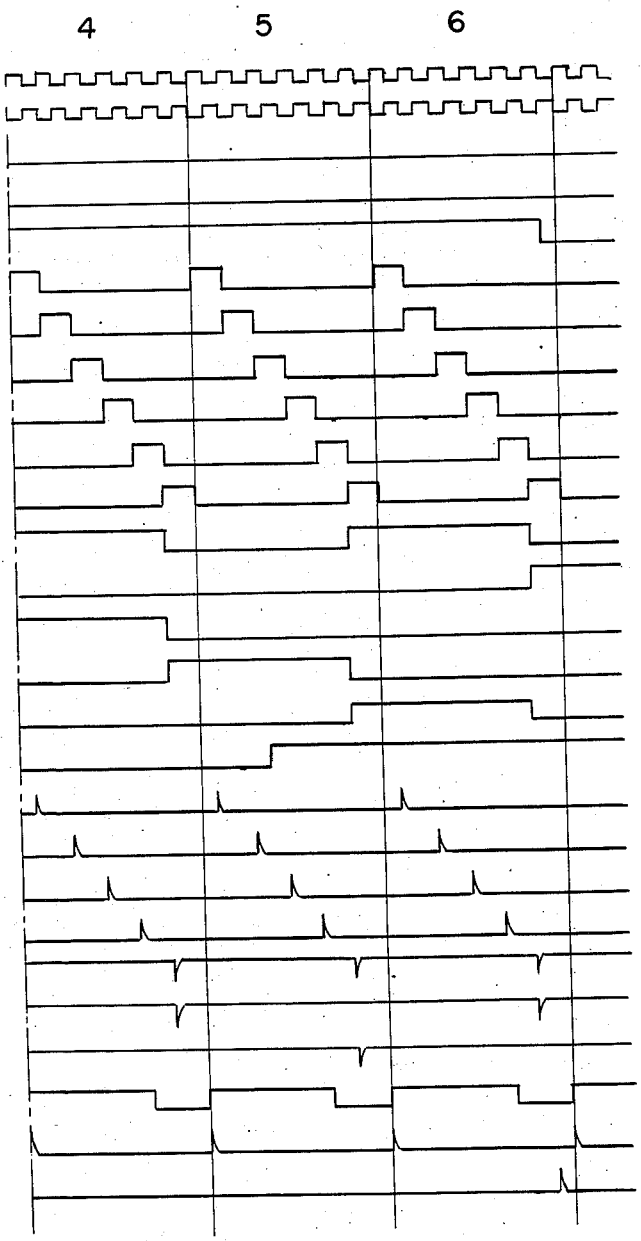

There follows a description of an illustrative system incorporating the present invention. The Fig. 1 of the drawings shows this illustrative system in a schematic form. The Fig. 2 with its alphabetical subdivisions (2a to 2h, inclusive, 2j, 2k and 2m to 2q, inclusive), which complete a continuous drawing if laid down from left to right in alphabetical order, illustrates a complete circuit diagram; while the Fig. 3 is an electronic timing diagram of the Fig. 2 circuit. The Fig. 4 is an extract sketch from the Fig. 2 which will aid in the understanding of the system.

In many respects, the present system is similar to that of the Dickinson application which may, therefore, be referred to for an understanding of the basic mode of operation of multipliers of the kind here involved. The inventive features of the present system will be pointed out as the description proceeds.

Referring to the Fig. 1, the system is designed to read a multiplier (MP) and a multiplicand (MC) from perforations in appropriate digit columns in the MP and MC sections of the card 1 and, after performing the necessary multiplying operations, to punch the product in terms of perforations in appropriate digit columns in the PR section of the card 1—the motion of the card, the reading, and the punching being substantially as in the Dickinson application. The MP is registered in the MP register 2 which has a ten-stage counter for each digit or each order of the MP. The MC is similarly registered in the MC register 3 which, however, has a binary counter for each MC digit or order. Thus, the MC register has four counter stages for each MC digit or order, the stages being respectively for the −1−, −2−, −4− and −8− bits so that any decimal digit in the MC taken from the card 1 may be registered in terms of combinations of these four components.

The source of all bit pulses which are to be used selectively to perform the multiplication is the pulse emitter or compute commutator 4 which generates cyclically a series of six pulses, the first of which represent respectively the bits –1–, –2–, –4– and –8–. The last two of the series of six are used for performing carry operation in the final accumulators, as will be explained. The pulse output of the emitter or commutator 4 is delivered to a partial product matrix constituted by a group of nine multiplier plates (× plates), all of which have LH and RH sections indicated by the numerals 5 and 6. As previously indicated, there are nine × plates labelled ×1 to ×9, the numeral portions of the designations indicating the MP digit to which they correspond. Thus, the ×9 plate is designed to pass all possible LH and RH bit pulse components necessary for the multiplication of the MP –9– value by any possible value in the MC register, i. e., any one or more of the components –1–, –2–, –4– and –8–. The similar is true for the ×8 plate and the MP digit –8–, and all other multiplier plates and MP digits.

The MP register selects for operation only that × plate corresponding to the digit which is registered in the MP register. This selection is made for only one MP digit or MP order at a time. When the selection is made, all other × plates are inoperative. The MC register receives the pulse output of the selected × plate and filters it in the sense that it chooses from this output only those LH and RH components which go into the multiplication of the particular MP digit by the quantity registered in the entire MC register.

As indicated, this is done for only one MP digit or order at a time. The CS commutator 7 (column shift commutator) serves to shift the MP register from one order to another for the purpose, i. e., it energizes the MP hundreds order for multiplication by the MP hundreds digit, and then the MP tens order for multiplication by the MP tens digit, etc. While this is going on, it is necessary to shift correspondingly the output pulses coming from the MC register into their proper orders (hundreds, thousands, etc.), and this is done by the column shift switch 8 (CSS) under the control of the CS commutator 7.

The distributor 9 receives the pulses from the CS switch 8 and distributes them among the three accumulators A, B and C. In this, the distributor 9 is controlled by impulses from the compute commutator 4 which are synchronous with the bit pulses.

Before proceeding further with the system, it is well to note the reason for the three accumulators A, B and C and the secondary commutator 10. As previously indicated, when it is attempted to economize on circuitry by using four-stage MC binary registers instead of the ten-stage decimal registers, a confusion of simultaneously occurring bit pulses may arise because two or more MC register stages are apt to be on similtaneously. That means that two stages may, for example, be putting out –2– bit pulses at the same time, or –1–, –4–, or –8– bit pulses. Any pulses produced simultaneously in that manner must be separated so that they will produce their individual effects in the accumulators, and the separation must be either in time or in position in the circuit.

The Chart A will show the problem more clearly. This chart shows all LH and RH bit components necessary to form the products of any MP decimal digit by any one of the four bit values –1–, –2–, –4–, or –8– represented respectively by the four tubes of the MC register. It is realized, of course, that the MC decimal digits –3–, –5–, –6–, –7– and –9– would be represented by the combination of groups of these four tubes in the MC register corresponding to the bits necessary to form those MC decimal digits. Thus, for example, on occasion the three MC tubes –1–, –2–, and –4– (representing decimal –7–) will simultaneously be developing the same bit pulses which will conflict if means are not provided to separate them. An examination of the Chart A will be helpful in understanding how this separation is accomplished in the system here disclosed.

CHART A

*Binary components required for MP decimal register MC binary (1–2–4–8) register*

| MP×MC (–1–) | Components | | MP×MC (–2–) | Components | |
|---|---|---|---|---|---|
| | LH | RH | | LH | RH |
| 9×1 | | 1 – – 8 | 9×2 | 1 – – – | – – – 8 |
| 8×1 | | – – – 8 | 8×2 | 1 – – – | – 2 4 – |
| 7×1 | | 1 2 4 – | 7×2 | 1 – – – | – – 4 – |
| 6×1 | | – 2 4 – | 6×2 | 1 – – – | – 2 – – |
| 5×1 | | 1 – 4 – | 5×2 | 1 – – – | – – – – |
| 4×1 | | – – 4 – | 4×2 | – – – – | – – – 8 |
| 3×1 | | 1 2 – – | 3×2 | – – – – | – 2 4 – |
| 2×1 | | – 2 – – | 2×2 | – – – – | – – 4 – |
| 1×1 | | – – – 1 | 1×2 | – – – – | – 2 – – |

| MP×MC (–4–) | Components | | MP×MC (–8–) | Components | |
|---|---|---|---|---|---|
| | LH | RH | | LH | RH |
| 9×4 | 1 2 – – | – 2 4 – | 9×8 | 1 2 4 – | – 2 – – |
| 8×4 | 1 2 – – | – 2 – – | 8×8 | – 2 4 – | – – 4 – |
| 7×4 | – 2 – – | – – – 8 | 7×8 | 1 – 4 – | – 2 4 – |
| 6×4 | – 2 – – | – – 4 – | 6×8 | – – 4 – | – – – 8 |
| 5×4 | – 2 – – | – – – – | 5×8 | – – 4 – | – – – – |
| 4×4 | 1 – – – | – 2 4 – | 4×8 | 1 2 – – | – 2 – – |
| 3×4 | 1 – – – | – 2 – – | 3×8 | – 2 – – | – – 4 – |
| 2×4 | – – – – | – – – 8 | 2×8 | 1 – – – | – 2 4 – |
| 1×4 | – – – – | – – 4 – | 1×8 | – – – – | – – – 8 |

In considering Chart A, it should be remembered that since the highest decimal digit is –9–, the MC (–8–) and (–4–) tubes of the MC register will never be used simultaneously. The same is true of the MC (–8–) and (–2–) tubes of the MC register. Therefore, conflict can only occur as between the MC (–1–) and MC (–8–) tubes when used to indicate decimal –9–, or among the MC (–1–), (–2–) and (–4–) tubes when used to designate the decimal digits –3–, –5–, –6– or –7–. The decimal –7– would be the worst case since all three of the latter MC tubes are on simultaneously; therefore, we may for the first three tubes restrict our consideration to this decimal –7– situation since if we eliminate conflict there, there can be no conflict in the groupings of the first three tubes. In other words, if conflict is eliminated for the decimal –9– grouping and the decimal –7– grouping, all possible conflicts will have been eliminated.

It is immediately apparent from the MC (–1–) and MC (–8–) columns of Chart A that there can be no LH conflict for the decimal –9– grouping since there are no LH components for the MC (–1–) column. Also, the only possible LH conflict is between the MC (–2–) and the MC (–4–) columns since MC (–8–) is never used with either of these. In the present system, this conflict is eliminated on a time displacement basis; either the MC (–2–) or the MC (–4–) value is multiplied in a separate computing cycle from the other three MC values.

With one or the other of the MC (–2–) and MC (–4–) values multiplied in a separate cycle, any remaining conflict will be seen to be among the RH components and they are eliminated in the present system on a circuit displacement basis, i. e., by sending potentially conflicting components to separate accumulators. For example, if the MC (–2–) value is handled in a separate cycle, the only possible RH conflicts are when the MC (–1–) and MC (–4–) values representing MC decimal –5– are multiplied simultaneously; and when the MC (–1–) and MC (–8–) values representing decimal –9– are multiplied simultaneously. This conflict is resolved by sending the output of the MC (–4–) and the MC (–8–) tubes (which cannot conflict with each other because never used simultaneously) to a different accumulator from the MC (–1–) tube output. Similarly, if the MC (–4–) tube is handled in a separate cycle, then the only possible RH conflict is when the MC (–1–) and MC (–2–) values representing decimal –3– are multiplied by the MP, and when the MC (–1–) and MC (–8–) values representing decimal –9– are multiplied by the MP. This conflict is resolved by sending the output of the MC (–2–) and MC (–8–) tubes to a separate accumulator from that of the –1– tube.

In the illustrated embodiment in the drawing and the following text, it is the MC (–2–) tube of the MC register which is handled in a separate cycle. Returning to the Fig. 1, this separate handling is accomplished by the use of the secondary commutator 10 and the A, B and C accumulators already indicated. The secondary commutator 10 is under the control of the compute commutator 4 and acts to render the MC (–2–) tube of the MC register inactive during the first compute cycle while the MC (–1–), (–4–) and (–8–) tubes are active. In the second compute cycle, it renders the latter three tubes inactive and activates the MC (–2–) tube for multiplication. Of course, these two cycles are repeated for each digit or order of the MP register. For the latter purpose, the secondary commutator 10 controls the CS commutator 7, i. e., after the secondary commutator controls the multiplication one MP digit by the MC values in two cycles, it pulses the CS commutator 7 to shift the system to the next MP digit or order for two cycles of multiplication at that order.

The distributor 9 channels all LH components or pulses into the A accumulator; it channels all RH pulses from the MC (–1–) and (–2–) tubes of the MC register into the B accumulator; and it channels all RH components or pulses from the MC (–4–) and (–8–) tubes of the MC register into the C accumulator. When all multiplications have been performed and the pulses channeled into the A, B and C accumulators, it is necessary that they all be transferred into a single accumulator in order that the final product may be brought into one place for transfer to the card 1. This is accomplished by means of the transfer units 11 and 12 which, under the control of the CS commutator 7, transfer the partial products of the A accumulator into the B accumulator, and likewise the partial products of the C accumulator into the B accumulator. From there, they are subsequently transferred to punch magnets 13 which record the result on the card 1 in the appropriate decimal digits column in the PR section, i. e., by the usual perforations of the card.

In all of this, it is understood that, as with the distributor 9, the transfer units 11 and 12 are under the control of the compute commutator 4, much as in the Dickinson system where the compute commutator controls the transfer from one of the two accumulators to the other.

For a more complete understanding of the system of Fig. 1, a detailed circuit diagram thereof is shown in the Fig. 2 and described in the following text. Reference to the electronics timing diagram of Fig. 3 will facilitate the understanding, and the sketch of Fig. 4 showing schematically the relation of the MC register tubes to the column shift switch, the distributors, and the accumulators will be of further help.

CARD HANDLING AND READING MECHANISM

For the mechanisms for handling of the card (card 1 of Fig. 1) and for reading the MP and MC perforations of the card into the MP and MC registers, the mechanism disclosed in the Dickinson application may be used and it is indicated schematically by the numeral 14 in Fig. 2. It may be considered as including a starting cam P11 producing a starting pulse (Fig. 3), as in the Dickinson application, to start the computing operation after the reading into the MP and MC registers has been completed; also lines 256 and 258 for resetting the triggers and accumulators as in the Dickinson application (pp. 66–67).

COMPUTE COMMUTATOR

The pulse emitter or compute commutator indicated schematically by the numeral 15 (4 of Fig. 1) may also be considered as identical with that shown in the Dickinson application. It will suffice here to point out that it is a conventional closed-ring type commutator wherein a subsequent stage is impulsed to be turned on whenever the preceding stage is turned off. This commutator produces cyclically the sequence of six voltage pulses indicated in Fig. 3a by the designations S1, S2, S4, S8, C1 and C2 which are identical with the pulses of corresponding designation in the compute commutator of the Dickinson application. The pulses, indicated by the curves S1, S2, S4 and S8, appearing on the wires 490, 492, 494 and 496, respectively, are used for the time-control of the distributor 9 and the transfer units 11 and 12, as will be indicated in greater detail below.

The compute commutator also includes means for generating voltages in pulse form indicated in the upper part of Fig. 3 with the designations "wire 240" and "wire 242" corresponding to those in the Dickinson application. The voltage pulses on wires 240 and 242 serve as the primary timing control for the electronic computing operations.

Synchronously, with the pulses S1, S2, S4, S8, the compute commutator 15 produces on the wires 270, 272, 274 and 276 bit pulses corresponding, respectively, to the four bits –1–, –2–, –4– and –8– of the binary code— these pulses being the ones processed through the multiplier plate under the control of the MP and MC registers and then on through the other mechanisms to the final accumulators, as already indicated in connection with Fig. 1. The compute commutator also produces pulses on the wires 278 and 280 to actuate and restore, respectively, the carry mechanisms in the final accumulators, substantially as in the Dickinson application. The waveform and time relationship of the pulses on these wires is indicated by the corresponding designation at the bottom of Fig. 3.

In a manner also indicated by the Dickinson application, the compute commutator sends out on the wire 174 a pulse to start computations; and a pulse out on wire 544 which returns on wire 236 as a pulse to stop computation (see bottom Fig. 3). The wire 526 leads from the last or C2 stage of the compute commutator, at the end of the compute cycle, a pulse which actuates the secondary commutator, as will be explained later.

BI-STABLE TRIGGER CIRCUITS

As in the Dickinson system, the fundamental memory device of this system is the bi-stable, double-triode trigger circuit shown, for example, in Fig. 8a of the U. S. Patent No. 2,514,035. The on status of the trigger is assumed to be that condition where the right-hand (RH) tube is conducting while the left-hand (LH) tube is off; the off status is the condition where the RH tube is not conducting and the LH tube is.

MP REGISTER

The MP register is the same decimal register as was used in the Dickinson application and, therefore, it is shown only schematically by the numeral 16; the wires 228 and 232 connecting it with the CS1 stage of the column shift commutator are the same wires as those bearing the same numbers in the Dickinson application and are, respectively, for the purpose of energizing the grids and anodes of the output tubes in the MP tens order when the CS1 stage of the column shift commutator is in operation. The CS1 stage corresponds to the CST stage in the Dickinson system, i. e., both are for controlling the multiplication by the MP tens order. The wires 230 and 234 are the same for the MP units order and are controlled by the CS2 stage of the column shift commutator which is the direct counterpart of the CSU stage in the Dickinson system, i. e., when CS2 is on, it controls multiplication by the MP units order by energizing the grids and anodes of the MP register units output tubes over wires 230 and 234.

And the wires 140, 148, 150 and 170 are the same as those of the same numbers in the Dickinson application and perform the same function, i. e., they cause the system to skip computing cycles if there is a zero registered in either of the MP orders.

The wire 280, as in the Dickinson system, insures that all carry stages of the accumulators are properly restored both during computing and during read out cycles. The wire 284 provides advancing impulses for the MP register during read in cycles.

The MP register can produce an output for each decimal digit so that the appropriate multiplier plate is selected by the digit. These outputs are indicated by the nine lines labeled by their corresponding decimal digits.

SECONDARY COMMUTATOR

The function of the secondary commutator is to control the multiplication of the MC in two compute cycles, the −1−, −4− and −8− bit stages in a first cycle, and the −2− stage in a second cycle. Of course, this is repeated for each digit or order to the MP. The secondary commutator also controls the advance of the column shift commutator so that the tens order of the MP is first multiplied and then the units order of the MP, and thereafter the necessary transfer operations are accomplished, as will be explained in greater detail below. In turn, the secondary commutator is controlled by the compute commutator.

The compute commutator controls the timing of all electronic operations. One cycle of the compute commutator, i. e., one completion of the series of six pulses, S1, S2, S4, S8, C1 and C2, advances the secondary commutator one position. That is to say, each time the compute commutator completes a cycle, it switches the secondary commutator trigger T107 from off to on, or vice versa. Since, as the timing diagram of Fig. 3 shows, the secondary commutator starts at off status and the computing cycles are always even in number, the secondary commutator is always returned to off status at the end of each computation.

This control of the secondary commutator stage T107 is effected through triode V528, the grid of which is energized through the wire 526 by the last or C2 stage of the compute commutator. A positive pulse at the end of the compute cycle along the wire 526 to the triode V528 results in a negative pulse along the wire 530 in the anode circuit of V528, and that pulse is passed on to T107 to turn it off or on, as the case may be.

Whenever T107 is switched from on to off, it supplies a pulse to the grid of V536 which results in a pulse in the anode circuit thereof, and that pulse is conveyed along the wire 184 to the column shift commutator to advance it at the end of even-numbered compute cycles.

Similarly, when T107 switches from off to on, it supplies through the follower triode V516 a pulse along the wire 606 used to control the CS3 stage of the column shift commutator, as will be pointed out later. V516 is cut off at this time.

When the follower triode V516 is cut off by the on condition of T107, its anode is raised to a high potential which is conveyed along the wire 518 to deactuate the −1−, −4− and −8− stages of the MC register during even-numbered compute cycles, as will be explained. Conversely, when T107 is off, the tube V516 is conducting because its grid is raised to a higher potential and, consequently, the anode voltage drops to activate the −1−, −4− and −8− stages of the MC register. In a very similar manner but in alternate compute cycles, the follower tube V516A activates or deactivates the −2− stage of the MC register. In other words, when T107 is on, the grid of V516A is at high potential—thereby dropping the anode potential so that a low voltage is conveyed along the wire 518A to activate the −2− MC stages; and when T107 is off, the tube V516A has a low grid potential and a high anode potential such that a high potential is conveyed along the wire 518A to de-activate the −2− stages of the MC register.

MC REGISTER

The MC register (Figs. 2a and 2b) is essentially the same as the binary MC register disclosed in the modification in the Dickinson application except for the alternate control of the −1−, −4−, −8− group of outputs in one cycle and the −2− output in a following cycle, and the consequent rearrangement of the lines leading to the column shift switch, i. e., provision must be made for the two accumulators in the RH group.

The MC is registered in each order or for each MC decimal digit in the binary counter triggers designated S1, S2, S4 and S8, representing code bits −1−, −2−, −4− and −8−, respectively. In other words, the decimal pulses from the card reading mechanism 14 are fed by the lines 17 and 18 to the inputs of their respective orders and depending upon the number of decimal pulses the proper combination of the S1, S2, S4 and S8 tubes will go on. This is because these four trigger tubes are arranged such that any one will be turned on only as the preceding stage is turned off. Thus, a first input pulse to S1 from the mechanisms 14 will turn it on (all stages initially off); a second pulse will turn S1 off and, consequently, S2 on; a third pulse will turn S1 on; a fourth pulse will turn S1 off which turns S2 off which turns S4 on; a fifth pulse turns S1 on; a sixth pulse turns S1 off and, consequently, S2 on; a seventh pulse turns S1 on; an eighth pulse turns S1 off, consequently S2 off, consequently S4 off and consequently S8 on; and a ninth pulse will turn S1 on. Thus, all decimal digits are provided for.

The manner in which the MC stages S1, S2, S4 and S8 control the flow of pulses from the × plates to the column shift switch is as follows. Each of the four triggers S1, S2, S4 and S8 has associated therewith two gate tubes V520A and V520B, as well as two pentodes V522A and V522B corresponding to LH and RH, respectively, (except for the S1 stage which requires only RH components and thus omits V522A). The functioning of the S2 stage will illustrate for the others.

When S2 is on, the consequent low potential of its left-hand grid is conveyed, as shown, to the grid of its associated V520A, and the previously mentioned low potential on wire 518A when the secondary commutator T107 is on renders V520B non-conducting. This non-conducting state of V520A and V520B raises their anode potential and, consequently, the potentials of the third grids in V522A and V522B, thereby conditioning them for conduction if binary pulses should appear on their first grids, i. e., an LH pulse on wire 550 or an RH pulse on the wire 558. It will be understood that the tubes V522A and V522B thus controlled by the MC S2 stage will receive over the wires 550 and 558, for LH and RH respectively, from the × plates all of the components required to multiply any selected MP decimal digit by binary MC −2−, as shown by the MC −2− column in Chart A above.

The pulses thus passed by the tubes V522A and V522B will be sent through their anodes over the wires 122 and 123 for the LH and RH, respectively, to the column shift switch.

The control exerted by the S1, S4 and S8 stages of the MC register on their corresponding V520A, V520B, V522A, and V522B tubes is essentially the same, as will appear from the circuit diagram, with the following exceptions. First, the grid of V520B tubes are driven negative by the wire 518 rather than 518A for reasons already indicated, i. e., the wire 518 goes negative when it is desired to operate the S1, S4 and S8 stages of multiplication. Next, the V522A tube is omitted in the case of the S1 stages because there are no LH components, as Chart A indicates. Lastly, the input into the first grid of the V522A and V522B tubes from the × plates is appropriately re-arranged and, likewise, for the anode output to the column shift switch. V522B for the S1 stage receives all the necessary RH components required by the corresponding column of Chart A over the wire 556 and transmits to the column shift switch over the wire 123.

The V522A and V522B tubes for the S4 stage receive their components required by the MC (–4–) columns of Chart A over the wires 552 and 560, LH and RH respectively, and transmit through their anodes to the column shift switch over the wires 122 and 125, respectively LH and RH. Similarly, the V522A and V522B tubes for the S8 stage receive their Chart A bit pulses on their first grids over the wires 554 and 562, LH and RH respectively, and transmit to the column shift switch over the wires 122 and 125. All of this is speaking of the tens MC order; the units MC order is the same, as will be apparent, except that the output wires 122 (LH), 123 (RH) and 125 (RH) are replaced by the similar output wires 126 (LH), 127 (RH) and 129 (RH).

It should be carefully noted that the RH outputs for S1 and S2 go out over separate wires from S4 and S8. This is so that they may be directed to the separate RH registers already referred to in brief above. In other words, components from the S4 and S8 stages go out over the wires 125 and 129 in the tens and units orders, respectively; the RH outputs from the S1 and S2 stages go out over the wires 123 and 127 of the tens and units orders, respectively. All LH components go out over the wires 122 and 126 of the tens and units orders, respectively. This is the pattern already referred to in discussing Fig. 1 as a way of avoiding conflict.

X PLATES

The X plate arrangement is essentially the same as that of the modified system described in the Dickinson application. It comprises nine X plates—one for each MP decimal digit. Within each of the nine plates there is a group of diode gates so arranged as to produce when conditioned by the MP register all bit components, both LH and RH, necessary to the multiplication of the particular MP decimal digit corresponding to the conditioned X plate by all possible MC bits, i. e., by –1–, –2–, –4–, or –8–. These components are illustrated by the Chart A.

A consideration of one particular X plate will make this more clear and also indicate how the other X plates operate. Take the X5 plate, for example. This is shown at the extreme lower-right corner of the X plate grouping in Fig. 2 and comprises five diode gates. Each gate includes a condenser 19, a voltage divider 20, and the three diodes 21, 22 and 23—all this referring to the gate which is in the extreme lower right-hand corner. All other gates and all other X plates are identical with this one in structure.

As explained in the Dickinson application bit pulses along the wires 270, 272, 274 and 276 from the compute commutator will pass through the condensers 19 and diodes 21 and 22 to one of the output wires 550, 552, 554, 556, 558, 560 and 562, depending upon whether the gates in any one X plate are conditioned by the imposition of a positive potential at the top of voltage dividers 20 by the appropriate one of the nine decimal digits lines coming from the MP register. If such conditioning is not in effect, then the pulses are grounded through the diodes 23, and so that particular X plate is ineffective in the multiplication process because of the grounding. Thus, all diode gates in any X plate, such as X5, are simultaneously conditioned for transmission of pulses to the MC register while all other X plates are de-conditioned. The X5 plate will be conditioned along the line indicated by decimal –5– from the MP register when an S5 stage of the MP register indicates the presence of a decimal –5– digit in whatever number is registered in the MP register, and that will impose the conditioning voltage at the top of all voltage dividers 20 in the X5 plate.

The bit requirements of X5 for multiplying an MP –5– by any one of the MC bits, –1–, –2–, –4– and –8–, are readily seen in Chart A if one picks the MP (–5–) multiplication from each of the four column groups. For example, –1– and –4– RH bits are required for the MC (–1–) X MP (–5–) multiplication, and they come from the first and third diode gates in the upper row which deliver the –1– pulse from line 270 to the output line 556 which will be seen to run to the V522B tubes of the S1 stage of the MC register. Next, to perform the MP (–5–) multiplication of MC (–2–), it is seen from Chart A that only an LH–1– pulse is required and that comes from the left diode gate of the lower row which receives its –1– pulse from the wire 270 and delivers it to the output line 550 for transmission to the V522A tube of the S2 MC stage. Similarly, it will be seen from Chart A that the multiplication of MP (–5–) by MC (–4–) required only an LH –2– bit which is received from the wire 272 and transmitted by the upper middle diode gate over the wire 552 to the left-hand V522A of the S4 stage in the MC register. Lastly, it is noted from the Chart A that the multiplication MP (–5–) by the MC (–8–) requires a –4– bit which is received from the wire 274 and transmitted by the lower right-hand gate to the wire 554 for transmission to the V522A tube of the S8 stage of the MC register.

If one traces through all of the wiring through all X plates, he will find that the components required by Chart A are delivered to their respective LH and RH outputs in the proper stage of the MC register in a manner similar to that explained for the X5 plate.

COLUMN SHIFT SWITCH

The column shift switch will receive all bit pulses coming over the wires 122, 123, 125, 126, 127 and 129 from the MC register output and shift them into their proper order, i. e., tens, hundreds, thousands, etc. This is done under the control of the column shift commutator, which will be described a little later because it coordinates most of what has been described up to this stage, including the column shift switch.

In considering the column shift switch, it will be helpful to refer not only to the lower portions of Figs. 2d, e and f which show the actual circuits used but also to the Fig. 4 in which the functioning is somewhat simplified by schematic representation.

The necessity and functioning of column shift switching will probably be grasped more quickly by the reader if he will refer for a moment to the Fig. 4 and recall that the S1, S2, S4 and S8 stages actually represent the decimal values indicated under the respective designations. For example, S8 represents –80– in the upper register, and S8 represents –8– in the lower or units register. One may visualize a corresponding stage in the MP register, for example, the S9 stage which would be the value –90– if in the tens register and the value –9– if in the units register. Suppose, then, that this MC S8 stage or –80– is being multiplied by a –99– in the MP register. On the first compute cycle when the tens or –90– is being multiplied by –80– for the product –7200–, it is quite apparent that the –2– bit in the RH column must go into the hundreds register; and that is what happens if only the upper switches (MP tens) of the switch pairs 24 through 29 are closed. At the same time, the –1–, –2–, –4– LH bits necessary to form the –7– must, obviously, go into the thousands distributor and accumulator which is what happens through the upper of the switches 24. When the multiplication is in the third compute cycle and it is a matter of multiplying the unit –9– by –80–, it is necessary that the RH –2– bit for the product –720– go into the tens distributor and that is what happens if the lower switches (MP units) of the switch pairs 24 through 29 are closed. At the same time, the –1–, –2– and –4– LH bits necessary to form the –7– go into the hundreds distributor, and that is what happens through the lower of the switch pair 24. A similar analysis will elucidate the necessary distribution among the other stages S1, S2 and S4.

The precise circuitry for bringing these results about is shown in the Fig. 2, and the principal tool is the diode gate, already described in connection with the × plate. There are twelve such diode gates, identified by the numerals (1)–(12) in the Fig. 2d, e and f. Each pair of gates is functionally a pair of single pole single throw switches schematically indicated in the Fig. 4 by the numerals 24 through 29 which are repeated in the Fig. 2 to show the appropriate correspondence between the diode gates of Fig. 2 and the schematic switches of Fig. 4.

Each pair of gates, 24 through 29, has a gate for the MP tens order or digit multiplication and a gate for the MP units digit multiplication. During the tens digit multiplication, the tens gate (1), (3), (5), (7), (9) and (11) are conditioned to transmit pulses to the distributors, and the units gates (2), (4), (6), (8), (10) and (12) are closed to any such pulse flow. The vice versa is true during the units multiplication; the units gates transmit and the tens gates do not. This conditioning is controlled by the wires 222 and 224 which run, respectively, from the CS1 and CS2 stages of the column shift commutator which will be explained in greater detail later. Suffice it to say CS1 controls the MP tens digit multiplication throughout the system when it is on; CS2 does similarly for the MP units multiplication. This behavior is manifested as a positive voltage on the wire 222 when CS1 is on and a positive voltage on the wire 224 when CS2 is on. This means that when CS1 is on, the diode tens gates (1), (3), (5), (7), (9) and (11) will be conditioned to transmit pulses to their respective wires 192, 300, 354, 446, 501 and 499 whereas such pulses would be grounded when the wire 222 is not conditioning the tens gates. Similarly, during the period when CS2 is on, the gates (2), (4), (6), (8), (10) and (12) will transmit pulses on the wires 268, 502, 507, 498, 503 and 505 but ground them when CS2 is not on.

Bit pulses for delivery to the wires 192, 268, 300, 502, 354, 507, 446, 498, 501, 503, 499 and 505 will be supplied to the gates by the triodes immediately to the left of each pair, i. e., one triode for each pair. These triodes are energized by bit pulses coming along the wires 122, 123, 126, 125, 127 and 129, previously discussed as the output from the MC register. If any one of these triodes receives a bit pulse at its grid, it will be converted into a corresponding anode circuit pulse delivered simultaneously to the input of its two associated gates. Therefore, depending upon which gate is conditioned, the pulse will go either to the upper or lower order indicated in the Fig. 4, for example. All such pulses will be sent to the three distributors, as will be explained later.

COLUMN SHIFT COMMUTATOR

Before proceeding further, it is well to consider the column shift commutator which coordinates the functioning of most of the system so far described, as well as playing some part in the operation of the transfer from the A to B accumulators and from the C to B accumulators, later described.

The column shift commutator includes an MP zero analyser which are those parts to the left of the stage labelled V48 in the column shift commutator and which are identical with those disclosed and described in the Dickinson application. It will suffice here to say that their function is to respond to the presence of a zero in either order of the MP register, as indicated by the on status of its S0 stage, and to so control the column shift commutator that it will completely skip the compute cycle for that order in which the zero appears. This is simply a time-saving device. It operates through the wires 140, 143, 150 and 170 as previously explained.

The remainder of the column shift commutator (those parts in the Fig. 2 to the right of the zero analyzer) is for the controlling of the multiplication, first through the first and second compute cycles for the MP tens digit and then through the third and fourth compute cycles for the MP units digit (CS1 and CS2 stages, respectively), and thereafter through performance of certain transfer operations, as previously suggested. The CS3 and CS4 stages, respectively control the transfer of the A to the B accumulator and the transfer of the C to the B accumulator. The CS5 stage is to provide two control impulses. The first impulse is utilized to produce an extra CS commutator advancing impulse which causes a C to B transfer cycle to begin immediately after the A to B transfer has been completed in the fifth compute cycle. The second impulse is utilized as a compute stop pulse to terminate each electronic computing operation.

The tubes V48, V46 and V44 are for energizing the tens order of the MP register through the wires 232 and 228 when the CS1 trigger is on—all as explained in connection with the tubes of corresponding number in the Dickinson application (CST of the latter application corresponding to CS1 of this application). As with the CSU stage of the Dickinson application, the tube V48A and the pentode and triode immediately to its right energize the MP register units order over the wires 230 and 234 when CS2 trigger (corresponding to CSU trigger of the Dickinson application) is on.

As in the Dickinson application, when the compute commutator 15 initially begins, it causes a pulse over the wires 174 and 176 of the column shift commutator (if a significant digit is registered in the tens order of the MP register), and that pulse turns the CS1 trigger on. When the CS1 trigger is on, its left-hand grid is at low potential as is, the direct connected grid of the tube V302 which is, therefore, shut off. The anode of V302 is, therefore, at high potential, and by voltage divider connection causes the output tube V300 to conduct through its load resistor R182, thus maintaining the potential of wire 222 at its higher value as long as CS1 is on. Wire 222 conditions the upper order of the column shift switch, as previously explained. CS1 remains on for two cycles of the compute commutator 15.

At the end of the second compute cycle, the secondary commutator T107, which supplies a negative pulse to the wire 184 whenever it goes off, supplies such a pulse over the wire 184 to turn off the CS1 trigger of the column shift commutator by impulsing its right-hand triode. When trigger CS1 turns off, its RH anode and the wire 220 rise in potential and this results in a positive pulse applied to the control grid of the pentodes V38 and V40. With a significant digit in the MP units order of the MP register, the wire 150 is at low potential and the tube V38 cannot conduct. But wire 170 is at high potential, and the tube V40 will, therefore, conduct to place a negative anode pulse on the wire 178 which turns on the CS2 trigger by impulsing its left hand triode.

With the CS2 trigger on, there results a situation similar to that which obtained when CS1 was on. The three tubes to the left of the CS2 trigger energize the MP units register, as already indicated. Further, the tube V301 imposes a positive potential on the wire 224 which energizes the column shift switch for shifting the same to the lower orders. CS2 remains on for two cycles (the third and fourth) of the compute commutator 15.

As with the turning off of CS1, a negative pulse over the wire 184 when the secondary commutator T107 goes off turns CS2 off, and, as with CS1 this will not happen until CS2 has run through two compute cycles, since T107 goes off only at the end of even numbered compute cycles. When CS2 turns off, a positive pulse on its RH anode and wire 221 is applied to the tube V39. The resulting negative anode pulse is fed by way of the wire 180 to turn on trigger CS3.

When CS3 is on, it maintains the wire 225 at a high potential for the purpose of conditioning the A to B transfer control tubes V344, as will be discussed later. Since A to B transfer can be accomplished in a single compute cycle, it is desirable that CS3 be left on only half the time that CS1 and CS2 were on. This is accomplished by the use of the trigger CS5 as follows.

In the fifth compute cycle, when CS3 is on, its RH grid is at zero bias. Thus, the control grid of associated pentode V600 is also at zero bias. The wire 602 is connected to the wire 274 from the compute commutator and, thus, received a −4− pulse during the fifth compute cycle, and that pulse is applied to the suppressor grid of the pentode V600. The resulting negative anode pulse turns on CS5.

With CS5 on, the control grid of associated tube V604 is at zero bias potential. Late in this fifth compute cycle, the secondary commutator trigger T107 is turned on as usual by a pulse on the wires 526 and 530 from the compute commutator. When T107 switches on, the associated follower tube V516 is cut off. Thus, the anode potential rises to generate a positive pulse on the wire 606 which is applied to the suppressor grid of tube V604. A momentary negative anode pulse is thereby applied to the wire 608 to turn off the CS3 trigger, as required. In turning off, CS3 supplies a negative pulse on the wire 610 which turns on CS4.

The turning on of CS4 imposes a high potential on the wire 227 which conditions the C to B transfer unit as will be explained later.

Like CS1 and CS2, the CS4 trigger is turned off by a negative pulse on the wire 184 generated by the turning off of the secondary commutator, T107, in response to the completion of the sixth compute cycle by the compute commutator. The turning off of CS4 is used to generate a stop signal for the system since computation will then be at an end. This is accomplished as follows.

When CS4 turns off, its associated tube V612 momentarily conducts to generate a negative anode pulse on the wire 176, and that pulse is effective to switch CS1 on, as at the start of the computation. With CS1 and CS5 now both on, the pentode V558 conducts. The resulting negative anode pulse is applied to cause cut off in the tube V542. The V542, V546 gate will, therefore, produce a positive anode pulse on the wire 236 when the wire 544 goes negative which will happen when the compute commutator completes its series of six pulses. The stop signal on the wire 236 is used to stop the compute commutator.

The control triggers CS1 and CS5 are still on at this time, but they will be reset by cam action as in the Dickinson system, i. e., by breaking the line 256 to raise the potential of the LH grids.

DISTRIBUTORS

The distributors, as well as the accumulators and transfer units, are individually much the same as the counterpart elements of the Dickinson system, shown in the Dickinson application. They differ essentially in that changes are necessary in order to accommodate the third accumulator necessary to the invention of this application.

The bit pulses coming from the output of the column shift switch on the wires 192, 300, 354, 446, 498, 501, 503, 499, and 505 must be separated by value and distributed into four channels, each of which will contain only one class (by value) of the bits. Thus, the −1− pulses must be directed into the −1− channel, the −2− pulses into the −2− channel, the −4− pulses into the −4− channel, and the −8− pulses into the −8− channel. This is in order that each bit may be entered laterally into its corresponding tube in the component accumulator. This separation and distribution is the function of the distributors.

The distributors comprise a row of four pentode gates for each of the above 9 wires from the column shift switch output. In Fig. 2, the distributors are in three groups (Fig. 2f, k, and o), one for each of the A, B and C accumulators. The behaviour of the four pentode gates handling the output from the wire 192 to channel it into the TH order of the A accumulator will illustrate the construction and operation of all the other pentode gates in the distributors.

Wire 192 applies whatever positive bit pulses are in the LH components it carries to the first grids of the pentodes V306, V262, V264, and V266. These positive pulses are, of course, in the time sequence of the pulses −1−, −2−, −4− and −8− sent out by the compute commutator over the wires 270, 272, 274 and 276 or the wires 490, 492, 494, and 496. The −1−, −2−, −4− and −8− pulses on these two series of four wires are, of course, synchronous with each other. The third grids of the tubes V306, V262, V264, and V266 are controlled by the pulses on the wires 490, 492, 494 and 496, respectively, those pulses having the wave-form indicated by S1, S2, S4, and S8 in Fig. 3. It will be seen therefore, that the wire 490 and its associated voltage divider maintained the first tube V306 in each distributor group in a zero bias condition for the third grid during the time when the compute commutator is in its S1 on status. Therefore, when any tube V306 receives a −1− pulse on its first grid, a negative anode pulse will appear in its anode circuit. For example, when wire 192 imposes a −1− pulse on its V306, a negative anode pulse will appear on the wire 286 and the resistor R162. This negative pulse is effective to reverse the status of the stage S1 of the A accumulator TH order, which is equivalent to entering a −1− in that order.

Similarly, wire 492 is maintained at high potential during the S2 status of the compute commutator; and, consequently, a −2− bit pulse appearing on wire 192 will be effective to render the V262 tube conductive, and wire 370 will transmit the resulting negative pulse to R162 and the S2 stage of the A accumulator TH order. Therefore, stage S2 will be reversed to register the entry of a −2− in that position.

The −4− and −8− bits pulses are similarly distributed from the wire 192 to the wires 372 and 374, respectively, under the control of the wires 494 and 496, respectively; and they are thereby entered into their respective S4 and S8 stages laterally in the A accumulator TH order by reversal of the status of those stages.

From this, it will be readily apparent how the four bit pulses on the other eight wires from the column shift switch are distributed by their corresponding pentodes V306, V262, V264 and V266 into their proper places in the accumulators, all under the control of the wires 490, 492, 494, and 496.

THE A ACCUMULATOR

The A accumulator receives the LH pulses passed by the X plates and by the MC register during multiplying. It comprises three orders labelled TH, H, and T. Each order includes, fundamentally, four stages, S1, S2, S4 and S8, for registering or accumulating respectively the bits −1−, −2−, −4− and −8−. Each stage comprises a basic trigger circuit arranged such that when any one stage goes off its reverses the next, although in going on it leaves the next unaffected. The triggered circuits are connected in cascade and are, thus, serially responsive to impulses applied at the wires 286 or through the tubes V310 as carry impulses from a lower order, if such exists.

Adjusting circuits are provided for maintaining each order in the tens notation, these being in the form of an arrangement described below which causes S8, whenever turned on, to reverse S2 and S4. Carry circuits are also provided for determining and applying a carry to the next higher order when a lower order passes from −9− to −0−. Each order is also arranged for the lateral entry of partial differential values (at wires 286, 370, 372 and 374). Such method of effecting an entry requires that in addition to the usual cascade connections between one trigger and the next, each stage must be provided with an independent input which must be capable of switching its related trigger to its alternate status. The TH order of the A accumulator will illustrate for all of the others since all are essentially the same.

Four lateral input lines 286, 370, 372 and 374 lead to the anodes of the tubes V310, V376, V378 and V380, respectively. Tubes V382, V384 and V386 associated with the stages S2, S4 and S8, respectively, are utilized for impulsing these stages from the stage preceding it whenever these preceding stages are turned off. Anode load resistors R162 develop increased voltage drop when entry pulses are received. The resulting negative pulses are effective to reverse the status of their associated stages S1, S2, S4 and S8, respectively.

Since each order of all of the A, B and C accumulators is constructed and functions like the orders of the accumulators in the Dickinson application, it will be unnecessary to go into further detail. It will suffice to point out here that each order is constructed so that it will behave in a decimal manner, that is, for example, if pulses are successively introduced at the input when all stages are off (S1, S2, S4 and S8 are off), the tubes for that order will go on in such order as to count up to –9– and return to –0– (all in off status) on the tenth pulse, and so on cyclically for each ten pulses. Similar results would be obtained if the pulses were introduced laterally at any one of the four tubes i. e., the order would be returned to its initial status every ten pulses. This is as in the Dickinson application and comes about because of the use of the two additional triggers D1 and D2 which operate to reverse the S2 and S4 stages whenever the S8 stage is turned on. The D1 and D2 triggers are monostable which means that they are turned on by turning on of S8 only long enough to perform their function of reversing S2 and S4. Also they are delayed in their action, D2 delaying longer than D1 and both delaying long enough to permit S1, S2, S4 and S8 to operate in their normal manner instantaneously. Thus, for example, if S2 and S4 were on with S8 off, and a lateral –8– pulse came into S8, S8 would go on, D1 would turn off S2 after a short delay and consequently S4 and S8 would go off, but D2 after its longer delay would turn S4 on again.

It may be well to reiterate the functioning of the CY triggers for carrying over to the next higher order, even though they are explained in the Dickinson application. S8 will go off only when the counter passes through the –0– of the decimal cycle. It will, of course, be necessary to carry over a unit to the next higher order counter whenever this occurs, and that is the function of the CY trigger under the control of the C1 and C2 pulses coming from the compute commutator over the wires 278 and 280, respectively.

When CY switches on as a result of S8 switching off, its left-hand tube is shut off, as is the associated tube V336. That partially conditions a triode gate (V336, V337) which shortly thereafter will be pulsed negatively over wire 278 by the compute commutator to produce a positive output pulse which represents the carry to the next higher order. The carry to the next higher order from any gate V336, V337 is effected by the imposition of a positive pulse leading into the S1 trigger of the next higher order, and occurs while the compute commutator is in its C1 pulse status; and, therefore, the carry cannot interfere with the entry of any bit into the accumulators because those entries have already taken place during the S1, S2, S4 and S8 stages of the compute commutator.

As soon as the carry operation is completed, a positive pulse appearing on the wire 280 as a result of the pulse C2 from the compute commuator switches the CY trigger back to its off status by applying a negative pulse to the RH triode of the CY trigger. This effectively restores the carry circuit for the next occasion when carry operation is needed.

The manner in which entries are channeled to the distributors and entered into the B and C accumulators as well as the manner in which carry operations are accomplished in them will be readily understood from the drawing since the operation of the A, B and C accumulators is essentially the same and also essentially the same as that of the two accumulators in the Dickinson application.

TRANSFER

As previously indicated, transfer from the A to B accumulators is accomplished under the control of the CS3 stage of the column shift commutator, and, similarly, transfer of the C to B accumulators is accomplished under the control of the CS4 stage of the column shift commutator. The instruments in each case are the indicated "A to B transfer unit" and the "C to B transfer unit" shown on the drawing, Fig. 2.

The A to B transfer unit comprises four triode gates for each order of the A accumulator, and one of the four gates is for each of the four bits –1–, –2–, –4–, and –8–. As previously explained, when CS3 of the column shift commutator is on, it imposes a positive potential on the wire 225. This positive potential increases the voltage drop across R164 and thereby reduces the bias of the third grids of the tubes V344 so that they may provide output pulses whenever their respective control grids receive value-timed impulses from the compute commutator over the wires 270, 272, 274, and 276, respectively. Thus, during the A to B transfer cycle, the tubes V344 develop negative output pulses on the wires 430, 432, 434 and 436. The pulse on wire 430 appears midway during the S1 pulse of the compute commutator and is applied to the grids of the tubes V346 which comprise the RH half of the first of the above mentioned triode gates; similarly, the wires 432, 434 and 436 during the three remaining pulses S2, S4 and S8 of the compute commutator apply pulses to the RH grids of the other three triode gates 346A, V428 and V454.

The transfer from the A accumulator TH order to the B accumulator TH order will illustrate for all orders. Assume, for example, that the decimal digit –5– is stored in the A component accumulator TH order at transfer time. This digit –5– is required to be entered into the B accumulator TH order. A –5– is represented by the on condition of stages S1 and S4. When S1 is on, its left-hand tube is shut off. Wire 294 connects the LH grid of S1 to the grid of V348 in the A to B transfer unit. Thus, as long as S1 is on, V348 will be shut off. During the S1 stage of the compute commutator, a negative pulse on wire 430 is applied to the grid of V346, causing it to shut off. Since tubes V348 and V346 are both now shut off, their parallel connected anodes will rise in potential, causing the associated tube V350 to conduct momentarily. The anode of V350 is direct-connected to the anode of V338 in the B accumulator by wire 296. The conducting of V350, therefore, causes a voltage drop across R166. The resulting negative pulse is applied to stage S1, TH order of the B accumulator. Thus, the status of S1 is reversed; and, in effect, a –1– has been added.

In order to complete the transferring of a decimal –5–, the next partial differential value to be treated will be the –4–. When stage S4 in the compute commutator is on, a positive pulse will be applied to wire 274, causing the third V344 to emit a negative pulse on wire 434. Since A accumulator trigger S4 is on, wire 298 will maintain the grid of tube V426 at cut off potential. Subsequently, when the negative pulse on wire 434 reaches the grid of V428, the A to B transfer gate associated with the –4– pulse will produce a positive potential in its anode circuit. This positive pulse is applied to the grid of the associated tube V350, causing it to conduct momentarily. The resulting negative pulse is applied to the input of the stage S4 in the B accumulator and will be effective to reverse its status.

Thus, the entry of the –1– and –4– bits into the B accumulator constitutes a transfer of decimal digit –5– from the A to B accumulators.

It should be noted that since the adjusting circuit in each accumulator order automatically adds a –6– into the order whenever the S8 stage turns on, the decimal digits –8– and –9– are represented by binary –14– and –15–, respectively (by the turning on of the S2 and S4 stages to maintain decimal notation). Thus, whenever it is required to transfer a –8–, for example, the transfer of the –2– and –4– must be suppressed. Similarly, the –2– and –4– must be suppressed whenever a –9– is transferred. Such suppression of the –2– is effected by providing a tube V352 in the gate circuit used for transferring a –2–. The grid of V352 is controlled by the LH anode potential of stage S8. Similarly, another tube V352 is provided in the gate circuit which normally transfers a –4–. This tube V352 is also controlled by the LH anode potential of stage S8. Accordingly, whenever S8 is on its left-hand anode is at high potential, and the both tubes V352 are maintained in conducting status to effectively block the –2– and –4– transfer gates.

Assume, now, that digit –8– is to be transferred. Digit –8– is represented by a binary –14– where stages S2, S4 and S8 are on. Since S8 is on, it is required that the transfer of –2– and –4– be suppressed. Wire 438 connected to the left-hand anode of S8 is, therefore, at high potential which produces an increased voltage across R168. Hence, the tubes V352 associated with the –2– and –4– gate are both in conducting status. Consequently, no output can be produced from these gates. Therefore, the required suppression has been accomplished. Since the A accumulator S8 is on, wire 440 is maintained at low potential—thus, shutting off tube V452 associated with the –8– transfer gate. Therefore, when wire 436 applies a negative pulse to V454, a positive output pulse is produced at the anodes of V452 and V454. This positive pulse momentarily causes V456 to conduct and thereby applies a negative pulse to the B accumulator stage –8–. It has been shown that the TH A accumulator digit –8–, which was registered as a binary –14–, has been transferred into the B accumulator TH order as a –8– partial value only and that the –2– and –4– values have been suppressed.

All other orders of the A to B transfer unit are constructed and operate essentially the same as the TH order as the circuit indicates.

The C to B transfer unit is essentially the same in construction as the A to B transfer unit and differs only in that it connects the appropriate orders of the C accumulator to the B accumulator. Its structure and operation will, therefore, be apparent from the Fig. 2. It is enough to point out that the tubes V344 are controlled, as in the case of the A to B transfer, by the wires 270, 272, 274, and 276 from the compute commutator; and these control the gates corresponding to those in the A to B transfer unit under the control of the various orders of the C accumulator. However, the C to B transfer unit is not operated until the pulse previously described over the wire 227 (corresponding to the somewhat earlier pulse over the wire 225 in the case of the A to B transfer) actuates the C to B transfer. As stated previously, this pulse on wire 227 occurs during the C4 stage of the column shift commutator. This transfer occurs later than the A to B transfer in order to avoid interference in entering the two into the B accumulator.

This completes the electronic multiplication. The results contained in the B accumulator may be read out on to suitable cards by the method disclosed in the Dickinson application, i. e., a series of ten impulses may be applied to the post 386 of the B accumulator, resulting in pulses emitted at the hubs 388, those latter pulses being employed to actuate suitable punching electromagnets.

Reset of the accumulators and, in fact, all of the triggers and other elements of the system for the next problem may be accomplished by substantially the same method as that disclosed in the Dickinson application.

SAMPLE MULTIPLICATION

The understanding of the circuit and its operation will be facilitated by considering a sample problem. Assume that –97– as the MC is to be multiplied by –83– as the MP in order to obtain a PR of –8051–. The bits required during each of the four compute cycles for this problem are indicated by the asterisks in the Chart A above. The Chart B which follows will illustrate how the bits of the PR are accumulated in the three accumulators A, B, C and finally transferred to the B accumulator as the series of six compute commutator pulses is cyclically repeated.

CHART B

Sample Problem: MP × MC = PR : 83 × 97 = 8051

| Accumulator | A | | | B | | | | C | | |
|---|---|---|---|---|---|---|---|---|---|---|
| | (LH) | | | (RH—S1 and S2) | | | | (RH—S4 and S8) | | |
| Cycle | TH | H | T | TH | H | T | U | H | T | U |
| 1 (80×95) S1 | 0 | 1 | 0 | 0 | 0 | 0 | 0 | 0 | 0 | 0 |
| S2 | 2 | 3 | 0 | 0 | 0 | 0 | 0 | 0 | 2 | 0 |
| S4 | 6 | 3 | 0 | 0 | 0 | 0 | 0 | 4 | 2 | 0 |
| S8 | 6 | 3 | 0 | 0 | 8 | 8 | 0 | 4 | 2 | 0 |
| C1 | 6 | 3 | 0 | 0 | 8 | 8 | 0 | 4 | 2 | 0 |
| C2 | 6 | 3 | 0 | 0 | 8 | 8 | 0 | 4 | 2 | 0 |
| 2 (80×2) S1 | 6 | 4 | 0 | 0 | 8 | 8 | 0 | 4 | 2 | 0 |
| S2 | 6 | 4 | 0 | 0 | 8 | 0* | 0 | 4 | 2 | 0 |
| S4 | 6 | 4 | 0 | 0 | 8 | 4 | 0 | 4 | 2 | 0 |
| S8 | 6 | 4 | 0 | 0 | 8 | 4 | 0 | 4 | 2 | 0 |
| C1 | 6 | 4 | 0 | 0 | 9 | 4 | 0 | 4 | 2 | 0 |
| C2 | 6 | 4 | 0 | 0 | 9 | 4 | 0 | 4 | 2 | 0 |
| Col. shift. | | | | | | | | | | |
| 3 (3×95) S1 | 6 | 4 | 1 | 0 | 9 | 5 | 1 | 4 | 2 | 0 |
| S2 | 6 | 6 | 1 | 0 | 9 | 7 | 3 | 4 | 2 | 2 |
| S4 | 6 | 6 | 1 | 0 | 9 | 7 | 3 | 4 | 6 | 2 |
| S8 | 6 | 6 | 1 | 0 | 9 | 7 | 3 | 4 | 6 | 2 |
| C1 | 6 | 6 | 1 | 0 | 9 | 7 | 3 | 4 | 6 | 2 |
| C2 | 6 | 6 | 1 | 0 | 9 | 7 | 3 | 4 | 6 | 2 |
| 4 (3×2) S1 | 6 | 6 | 1 | 0 | 9 | 7 | 3 | 4 | 6 | 2 |
| S2 | 6 | 6 | 1 | 0 | 9 | 7 | 5 | 4 | 6 | 2 |
| S4 | 6 | 6 | 1 | 0 | 9 | 7 | 9 | 4 | 6 | 2 |
| S8 | 6 | 6 | 1 | 0 | 9 | 7 | 9 | 4 | 6 | 2 |
| C1 | 6 | 6 | 1 | 0 | 9 | 7 | 9 | 4 | 6 | 2 |
| C2 | 6 | 6 | 1 | 0 | 9 | 7 | 9 | 4 | 6 | 2 |
| Col. shift. | | | | | | | | | | |
| A to B Trans. 5 S1 | 6 | 6 | 1 | 0 | 9 | 8 | 9 | 4 | 6 | 2 |
| S2 | 6 | 6 | 1 | 2 | 1* | 8 | 9 | 4 | 6 | 2 |
| S4 | 6 | 6 | 1 | 6 | 5 | 8 | 9 | 4 | 6 | 2 |
| S8 | 6 | 6 | 1 | 6 | 5 | 8 | 9 | 4 | 6 | 2 |
| C1 | 6 | 6 | 1 | 7 | 5 | 8 | 9 | 4 | 6 | 2 |
| C2 | 6 | 6 | 1 | 7 | 5 | 8 | 9 | 4 | 6 | 2 |
| Col. shift. | | | | | | | | | | |
| C to B Trans. 6 S1 | 6 | 6 | 1 | 7 | 5 | 8 | 9 | 4 | 6 | 2 |
| S2 | 6 | 6 | 1 | 7 | 5 | 0* | 1* | 4 | 6 | 2 |
| S4 | 6 | 6 | 1 | 7 | 9 | 4 | 1 | 4 | 6 | 2 |
| S8 | 6 | 6 | 1 | 6 | 9 | 4 | 1 | 4 | 6 | 2 |
| C1 | 6 | 6 | 1 | 7 | 8 | 0* | 5 | 1 | 4 | 6 | 2 |
| C2 | 6 | 6 | 1 | 8 | 0 | 5 | 1 | 4 | 6 | 2 |

*Carry set up.                    Result

It is understood that all control triggers have been reset to off status and all accumulators reset to zero status before the MP –83– and the MC –97– are read into the MP and MC registers, respectively. The manner in which these quantities are read into the registers is already clear and need not be repeated. The MC is indicated by the on status of S1 and S8 of the MC tens order and the on status of S1, S2 and S4 in the MC units order. The MP amount –83– is indicated by the on status of the S8 stage in the MP tens order and the S3 stage in the MP units order operating, of course, through the output wires designated –8– and –3– leading from the MP register to the respective multiplier plates ×8 and ×3 which are to be conditioned in sequence. ×8 will be conditioned to transmit pulses to the MC register during the first two compute cycles, and ×3 will be conditioned similarly during the third and fourth compute cycles.

The conditioning is effected by the MP tens order and MP units order respectively under the control of CS1 and CS2 of the CS commutator. When either ×8 or X3 is conditioned, all other X plates are deconditioned.

As explained in the Dickinson application, computing is begun by initiating the action of the compute commutator 15 in running through the first compute cycle, i. e., in generating the first series of compute commutator pulses S1, S2, S4, S8, C1 and C2. This initial action causes a negative pulse to appear on the wire 174 which feeds to the input of the zero analyzer. Since both MP register orders contain significant digits, the zero analyzer then provides a negative pulse on the wire 176 which is effective to turn on the column shift commutator trigger CS1. If CS1 is on, and so long as it is on, it imposes a positive potential on the wire 222 which, thus, conditions the upper order switches of the column shift switch, namely, the diode gates labelled (1), (3), (5), (7), (9) and (11). At the same time, voltages (as previously explained) along the wires 228 and 232 energize the tens MP register so that the S8 stage in the tens MP register may condition the X8 plate by applying a high voltage to the line designated –8– in the MP output.

At this time, the secondary commutator T107 is off because the completion of any previous computation restores it to the off condition. This is because T107 is pulsed along the wire 526 and wire 530 at the end of each compute cycle; and since there is an even number of compute cycles for every computation, T107 is restored to its original off status. T107 is initially reset by action of cancel line 256.

With secondary trigger T107 off, there can be no output from the MC S2 stages; there can be none from the S4 stage of the tens order because that stage is off. Similarly, there can be none from the S8 units stage because that is off. The only stages prepared to transmit pulses are, therefore, S1 and S8 of the tens order and S1 and S4 of the units order. S1 of the tens order is conditioned to produce output pulses on wire 123, and, similarly, S8 is conditioned to impulse the wires 122 and 125, LH and RH respectively. Similarly, the MC units S1 output stage will impulse the wire 127, and the S4 stage will impulse the wires 126 and 129, LH and RH respectively.

The system is now ready to multiply the entire MC amount by the MP tens order digit –8–. All the circuit conditioning and adjusting described above occur almost instantaneously with the pulse designated "start cam P11" shown in Fig. 3. The compute commutator is, therefore, free to send its pulses through the selected X8 plate, through the on stages of the MC register, through the upper order of the column shift switch, and on to the distributors and accumulators.

Actually, during the first cycle, the system is forming the partial product –80–X–95–. The MC S2 stages are off.

With the S1 stage of the compute commutator on, it raises the wire 490 to high potential for the pulse S1 indicated by Fig. 3. The wire 490 conditions the distributor –1– gate tubes, such as tube V306 associated with the A components accumulator TH order. Thus, any –1– bit required will be generated and entered into the component accumulators during the S1 pulse. Similar –2–, –4– and –8– bit pulses will be sent out on the corresponding wires 272, 274 and 276 when the compute commutator is in its S2, S4 and S8 stages of on status. These, of course, go to all X plates, but we need consider only the X8 plate since that is the only one conditioned at this stage or at this time.

As both Charts A and B will indicate, the only –1– bit required during this first compute cycle (for product 80X4) is LH and must go to the hundreds A accumulator. This is because it is brought out in the multiplication of –80– by the S4 of the MC units register to produce the partial product –320–. That pulse proceeds from the wire 270 through the diode gate in the upper left corner of the X8 plate to the wire 552 and thence to the V522A tube of S4 MC units to go out over the wire 126 to the pair 27, gate (7), of the column shift switch and thence over the wire 446 and the distributor into the A accumulator hundreds order. It will be recalled that at this time the left-hand pentode in each distributor is conditioned by a positive potential on the wire 490. Therefore, the left-hand pentode can conduct to effect the entry of a –1– bit into the A accumulator H order. Chart B shows this as a –1– entry in the hundreds column, A accumulator.

The compute commutator now advances to the on status of its S2 stage for the generation of –2– bit pulses over the wires 272 and 492. As Chart A indicates, there are three –2– pulses required (for products 80X8 and 80X4), two LH and one RH, and all in different orders. They will be entered in the accumulators simultaneously as follows.

The –2– pulse on wire 272 enters the X8 plate and emerges as an effective –2– pulse on each of the three wires 544, 552 and 560. Upon reaching the MC –8– tens LH output gate, wire 554 causes a –2– pulse on wire 122. This –2– pulse travels by way of the column shift switch (1), wire 192, pentode V262 to the A accumulator TH order. The pulse on wire 552 is effective by way of the MC units order S4 LH output wire 126, column shift switch (7), wire 446, and the distributor second pentode to enter a –2– pulse in the A accumulator H order. The third –2– pulse is entered by way of wire 560, MC units order S4 RH output wire 129, column shift switch (11), wire 499, and the distributor second pentode to the C accumulator T order. These three –2– bits are shown accumulated in Chart B along the line S2 of the first cycle.

As chart A indicates, during the time when the compute commutator is on in its S4 stage, two –4– bits are required, one LH and the other RH (for the product 80X8). These are entered in the accumulators A and C, respectively as follows: from the wire 274 through the X8 plate and wire 554, MC tens S8 LH output wire 122, column shift switch (1), wire 192, distributor V264, and from there into the A accumulator TH order; from the wire 274 through the X8 plate, wire 562, MC tens S8 RH output wire 125, column shift switch (5), wire 354, the distributor and from there into the C accumulator H order.

It is understood that while the –4– bits are being registered, the third pentodes of each row of distributors are conditioned by positive potential on the wire 494 (S4 of compute commutator on). Correspondingly, when the –2– bits were being entered, the second pentodes of each distributor row were conditioned for conduction by positive potential on the wire 492 (S2 of compute commutator on). A similar situation will obtain for the –8– bit and the fourth pentodes and the positive potential on the wire 496 when the compute commutator is in its S8 stage.

When the compute commutator S8 stage is on, two –8– bits will be entered into the B accumulator as follows: These are required for both the MC S1 register stages—tens (80X10) and units (80X1). These –8– bits originate, of course, on the wire 276, and the first of them moves through the X8 plate, wire 556, MC tens output wire 123, the column shift (3), wire 300, the distributor, and from there into the B accumulator H order. Similarly, wire 276 conducts a second –8– pulse through the X8 plate, the wire 556, MC units output wire 127, column shift switch (9), wire 501, the distributor, and from there to the B accumulator T order.

During the next or C1 stage of the compute commutator, any carry trigger in the accumulators which had been set up would effect a carry into the next higher order of the accumulator. However, at this stage, no carry set up has yet been called for.

As the last stage C2 of the compute commutator turns on, it pulses the wire 526 and thereby through the tube V528, and the wire 530 switches the trigger T107 from off to on. The compute commutator will then repeat its series of six pulses in a second compute cycle while the MC −2− values are multiplied by the MP tens digit −8−.

The second compute cycle which is just beginning is to multiply −80− by −2−. As Chart A indicates in the MC −2− column, only a single −1− bit is required in the LH order. This is entered as follows: from wire 270, the × plate, wire 550, the MC units output wire 126, the column shift switch (7), the wire 446, the distributor, and from there to the A accumulator H order.

Similarly, when S2 of the compute commutator is on, only a single −2− bit will be required in the RH accumulators. This will be entered from the wire 272, the ×8 plate, wire 558, MC units output wire 127, column shift switch (9), wire 501, to the B accumulator T order. This order already contains a −8−, and the −2−, just entered, causes this order to turn from −8− to −0−. Hence, the carry trigger CY is turned on.

When S4 of the compute commutator is on, a −4− will be entered into the B accumulator by way of the wire 274, the ×8 plate, the wire 558, the MC units output wire 127, column shift switch (9), wire 501, the distributor, and the B accumulator T order.

When S8 is on, no further entries will be made because no −8− bits are required for this compute cycle.

When the compute commutator stage C1 turns on, carry effecting means operate as follows. The C1 stage of the compute commutator operates to impose a negative pulse on the wire 278, as Fig. 3 shows. This negative pulse is conveyed to the carry stages of the accumulators, for example, the RH tube V337 associated with the A accumulator TH order which tube is cut off. The V336, V337 gate will, therefore, emit a positive anode pulse if its associated CY trigger is on. This positive anode pulse is used to effect carry into the next higher order, if there is one. The same mechanism is used for the last stage of all the accumulator orders.

In the present example, the carry trigger CY in the B accumulator T order is on. Thus, when the potential of the wire 278 drops, a positive pulse on wire 514 causes tube V424 momentarily to conduct. The resulting negative anode pulse switches the stage S1 in the H order from off to on. This order now stands at −9− after entry of the carry from the T order. No other carry operations are called for at this time.

As the compute commutator stage C1 turns off, stage C2 turns on as before; as C2 stage turns on, the secondary trigger T107 switches off because of a pulse on the wires 526 and 530.

At the end of each compute cycle, it is necessary to restore the carry effecting means in the accumulators. This is done by the generation of a positive pulse on wire 280 by the compute commutator when in its C2 stage. This positive pulse is applied to the grid of the indicated triode in each accumulator order. Momentary conduction of this triode turns off the associated carry trigger CY.

We are now ready to proceed to the third and fourth compute cycles for the multiplication of the MC quantity by the units MP digit.

As indicated, T107 is turned off by the last pulse of the compute commutator. However, as T107 turn off, a positive pulse is applied from its RH anode to the tube V536. The resulting V536 negative pulse is applied by way of wire 184 to the column shift commutator. CS1 will, therefore, be switched from on to off at this time.

Since the MP factor −83− still stands in that register, the MP zero analyzer unit is conditioned for turning on CS2 by the following means. When the column shift trigger CS1 turns off its RH anode and wire 220 rise in potential, this positive pulse is applied to the control grids of pentodes V38 and V40. Since there is a significant digit −3− in the MP units order the wire 150 is at low potential and the tube V38 cannot conduct. But wire 170 is at high potential and tube V40 will, therefore, conduct to place a negative anode pulse on wire 178 which turns CS2 on. The on status of CS2 energizes the MP register units order to condition the ×3 plate by way of a positive potential applied to the −3− wire leading from the MP register to the ×3 plate.

Since T107 is now off and the wire 518 is at low potential, the MC −1−, −4− and −8− stages are conditioned, as was the case during the first cycle. Therefore, the MC −1−, −4− and −8− values will be multiplied during this following or third compute cycle.

It is understood that the on status of CS2 stage in the column shift commutator imposes a positive voltage on the wire 224, so that the lower order diode gates of the column shift switch are conditioned to transmit pulses to the distributor, i. e., the diode gates (2), (4), (6), (8), (10) and (12).

The system is, therefore, set up to proceed with the MP units multiplication by the entire MC quantity.

When compute commutator S1 is on during the third compute cycle three −1− bits, two RH and one LH, will be entered as follows. The first is from the wire 270 to the ×3 plate, wire 552, MC units order output wire 126, column shift switch (8), wire 498, distributor, and from there into the A accumulator T order. The next −1− bit is from the wire 270 to the ×3 plate, to wire 556, to MC tens output wire 123, column shift switch (4), wire 502, capacitor C187, wire 501, distributor, and the B accumulator T order. The third −1− bit comes from the wire 270 to the ×3 plate, wire 556, MC units output wire 127, column shift switch (10), wire 503, the distributor, and from there to the B accumulator U order.

When the compute commutator then shifts to its S2 stage, four −2− bits will be entered as follows and as required by Chart A. A first −2− bit will move from the wire 272 to the ×3 plate to the wire 554, to the MC tens S8 LH output wire 122, the column shift switch (2), the wire 268, the capacitor C282, the wire 446, the distributor, and from there to the A accumulator H order. Another −2− pulse will flow from the wire 272 to the ×3 plate, over the wire 556, to the MC tens S1 output wire 123, column shift switch (4), wire 502, capacitor C187, wire 501, and from there to the B accumulator T order. A third −2− bit will flow from the wire 272 to the ×3 plate, to the wire 556, to the MC units output wire 127, to the column shift switch (10), to the wire 503, and from there to the B accumulator U order. A fourth −2− bit pulse will flow from the wire 272, to the ×3 plate, to the wire 560, to the MC units S4 RH output wire 129, to the column shift switch (12), to the wire 505, to the distributor, and from there to the C accumulator U order.

A single −4− RH bit pulse is required in the period when compute commutator is in its C4 stage of on status. This flows from the wire 274 to the ×3 plate, to the wire 562, to the MC tens wire 125, to the column shift switch (6), to the wire 507, condenser C189, wire 499, distributor, and from there to the C accumulator T order.

No further entries or carry operations are required during the remainder of the third compute cycle. At the end of that compute cycle, the secondary trigger T107 will switch on in the now familiar manner.

During the fourth compute cycle, the MC −2− value (3×2) will be multiplied. However, no entries will be made until the S2 stage of the compute commutator is on. This −2− bit will be entered as follows. From the wire 272, it moves into the ×3 plate and from there to the wire 558, to the MC RH units wire 127, to the column shift switch (10), to the wire 503, the distributor and the B accumulator U order. During the S4 stage of the compute commutator, the last component value will be entered into the B accumulator in the following manner.

It moves from the wire 274 to the X3 plate, to the wire 558, to the MC units wire 127, to the column shift switch (10), to the wire 503, to the distributor and to the B accumulator U order where a −4− is registered.

No carry operation is called for in this cycle.

When compute commutator stage C2 turns on, the secondary trigger T107 is turned off, and a column shift advance pulse on the wire 184 turns off CS2. When CS2 turns off, a positive pulse on its RH anode and wire 221 is applied to the tube V39. The resulting negative anode pulse is fed by way of wire 180 to turn on CS3.

With CS3 on, the wire 225 is maintained at a high potential. Thus, the four A to B transfer unit control tubes V344 are suppressor grid conditioned for the entire fifth compute cycle. Then, as the control grids of the tubes V344 are sequentially impulsed by way of wires 270, 272, 274 and 276, negative anode pulses will be applied to the corresponding −1−, −2−, −4− and −8− gates in the A to B transfer units. Thus any transfer gate conditioned by a digit standing in a related A accumulator order will be effective to enter a corresponding value in the B component accumulator.

It will be remembered that a −2− and −4− suppression circuit is required to operate whenever a −8− or −9− is transferred. The operation of that circuit has been described above and in the Dickinson application.

As the Chart B indicates, the amount −661− stands in the A accumulator at the end of the fourth compute cycle, and this will be entered into the B accumulator during the fifth compute cycle. In this a carry over from H to the TH order will occur, as Chart B indicates. At the end of the A to B transfer cycle, the B accumulator contains the amount −7589−.

As the timing relationships of the column shift commutator, indicated by Fig. 3, show, the CS5 trigger of the column shift commutator is turned on during the fifth compute cycle. The purpose of this trigger is to establish a condition such that a special advance pulse for the column shift commutator can be generated near the end of the fifth compute cycle. This is done because only one compute cycle is necessary for the A to B transfer, in contrast to the two compute cycles for each advance of the column shift commutator previously required during the calculation. CS5 is turned on by the following means.

In the fifth compute cycle when CS3 is on, its RH grid is at zero bias. Thus, the control grid of associated pentode V600 is also at zero bias. Midway in the fifth compute cycle, the compute commutator generates its usual −4− pulse on wire 274, and this is applied by way of the wire 602 to the suppressor grid of pentode V600. The resulting negative anode pulse is applied to turn CS5 on.

With CS5 now on, the control grid of associated tube V604 is at zero bias potential. Late in this cycle, the secondary commutator trigger T107 is turned on in a manner now clear. When T107 switches on, the associated follower tube V516 is cut off. Thus, the anode potential rises to generate a positive pulse on wire 606 which is applied to the suppressor grid of tube V604. A momentary negative anode pulse is thereby applied by way of wire 608 to turn off the CS3 trigger, as required. As CS3 turns off, a negative pulse on wire 610 is used to turn on CS4.

With CS4 now on, the system is prepared to perform the C to B transfer operation during the sixth and final compute cycle. The C to B transfer circuit is conditioned by means of the CS4 LH anode and the wire 227 which is now at high potential.

Accordingly, during the final compute cycle, the C accumulator amount −462− is entered in the B accumulator. When this amount −462− is added to the −7589− amount in the B accumulator, the total becomes −8051−. This is the correct product which results when −97− is multiplied by −83−. Near the end of this last compute cycle, the control circuits provide the "carry operate" and "carry restore" signals over the wires 278 and 280 in the same manner as in the case of the carry operations previously performed in the three separate accumulators.

It is, of course, necessary to generate a stop signal to terminate computations, and this is done as follows. The last or C2 pulse of the compute commutator turns off the secondary trigger T107 by a pulse over the wires 526 and 530, as previously described. As T107 turns off, the usual column shift commutator advancing pulse turns off CS4 by way of wire 184. When CS4 turns off, its associated tube V612 momentarily conducts to generate a negative anode pulse on the wire 176. This pulse is effective to turn CS1 of the column shift commutator on.

With CS1 and CS5 now both on, pentode V558 conducts. The resulting negative anode pulse is applied to cause cut-off in the tube V542. The V542 and V546 gate will, therefore, produce a positive anode pulse on wire 236 when wire 544 goes negative. Wire 544 becomes negative near the end of each compute cycle when the compute commutator is producing its C2 pulse. Therefore, the compute stop signal on wire 236 occurs during the last pulse of the last compute cycle. This positive pulse on the wire 236 is used to prevent the initiation of another series of six pulses by the compute commutator, substantially as in the Dickinson application. Therefore, the compute commutator latches up at zero, and the complete multiplying operation has been performed. The complete product is now stored in the result or B accumulator.

The A and C accumulators contain the partial products accumulated during the computing operation just described, but all accumulators will be cleared before the next electronic computation begins.

Also, the control triggers CS1 and CS5 of the column shift commutator are still on, and these triggers will be reset to off status by cancel cam action.

The latter actions of clearing the A and C registers, the performance of the read-out operation, and the resetting of the CS1 and CS5 and all other triggers are substantially as in the Dickinson application.

What is claimed is:

1. In a multiplying system of the type in which bit code pulses from a pulse emitter are sent through a multiplier plate in a partial product matrix selected by a multiplier register and filtered through a multiplicand register to accumulators which accumulate partial products in terms of the code, a multiplicand register which registers the multiplicand in components code whereby each digit of the multiplicand may be indicated by more than one multiplicand component, and means for avoiding conflict between potentially conflicting partial product pulses which might result from the simultaneous multiplication of two or more multiplicand components by the multiplier comprising means for multiplying selected of the multiplicand components by the multiplier at different times from the remaining multiplicand components, and means for multiplying two or more of the remaining multiplicand components by the multiplier simultaneously together with means for sending potentially conflicting partial product pulses resulting from the latter simultaneous multiplication to separate accumulators.

2. In a multiplying system of the type in which bit code pulses from a pulse emitter are sent through a multiplier plate in a partial product matrix selected by a multiplier register and filtered through a multiplicand register to accumulators which accumulate partial products in terms of the code, a multiplicand register which registers the multiplicand in components code whereby each digit of the multiplicand may be indicated by more than one multiplicand component, and means for avoiding conflict between potentially conflicting partial product pulses which might result from the simultaneous multiplication of two or more multiplicand components by the multiplier comprising a secondary commutator controlled by said pulse emitter for effecting multiplication of selected of the multiplicand components by the multiplier at one time and two or more of the remaining multiplicand components by the multiplier simultaneously at another time, and means for sending potentially conflicting partial product pulses resulting from the latter simultaneous multiplication to separate accumulators.

3. A system as in claim 2 including a multiplier register which registers in decimal digits and in which the multiplicand register registers in a –1–, –2–, –4–, –8– bit code, and including an accumulator connected to receive the LH components, an accumulator connected to receive selected of the RH components, and an accumulator connected to receive the remaining RH components, one of the multiplicand –2– and –4– components being the multiplicand components selected for multiplication at the one time, all remaining of the –1– –2– –4– –8– multiplicand components being those multiplied at another time.

4. A system as in claim 2 including a multiplier register which registers in decimal digits and in which the multiplicand register registers in a –1–, –2–, –4–, –8– bit code, and including an accumulator connected to receive the LH components, an accumulator connected to receive the RH components from the multiplication of the multiplicand –1– and –2– components, and an accumulator connected to receive the RH components from the multiplication of the multiplicand –4– and –2– components, the multiplicand –2– component being the multiplicand component selected for multiplication at the one time, the –1– –4– –8– multiplicand components being those multiplied at another time.

5. A system as in claim 2 including a multiplier register which registers in decimal digits and in which the multiplicand register registers in a –1–, –2–, –4–, –8– bit code, and including an accumulator connected to receive the LH components, an accumulator connected to receive the RH components from the multiplication of the multiplicand –1– and –4– components, and an accumulator connected to receive the RH components from the multiplication of the multiplicand –2– and –8– components, the multiplicand component being the multiplicand component selected for multiplication at the one time, the –1– –2– –8– multiplicand being those multiplied at another time.

6. In a multiplying system, a pulse emitter for producing bit code pulses and a partial product matrix constituted by a plurality of multiplier plates to which the pulses are sent, a multiplier register for successively selecting a multiplier plate corresponding to each of the orders of the registered multiplier, a multiplicand register for filtering pulses from the selected multiplier plates and which registers the multiplicand in components code whereby each digit of the multiplicand may be indicated by more than one multiplicand component, a column shift commutator for controlling the successive selection of multiplier plates by the multiplicand register, and means for avoiding conflict between potentially conflicting partial product pulses which might result from the simultaneous multiplication of two or more multiplicand components by the multiplier comprising a secondary commutator for controlling said column shift commutator and controlled by the pulse emitter for effecting multiplication of selected of the multiplicand components by the multiplier at one time and two or more of the remaining multiplicand components by the multiplier simultaneously at another time, and means under the control of the pulse emitter for sending potentially conflicting partial product pulses resulting from the latter simultaneous multiplication to separate accumulators.

7. A system as in claim 6 in which the multiplier register registers in decimal digits and the multiplicand register registers in a –1–, –2–, –4–, –8– bit code, and including an accumulator connected to receive the LH components, an accumulator connected to receive selected of the RH components, and an accumulator connected to receive the remaining RH components, one of the multiplicand –2– and –4– components being the multiplicand components selected for multiplication at the one time, all remaining of the –1– –2– –4– –8– multiplicand components being those multiplied at another time.

8. A system as in claim 6 in which the multiplier register registers in decimal digits and the multiplicand register registers in a –1–, –2–, –4–, –8– bit code, and including an accumulator connected to receive the LH components, an accumulator connected to receive the RH components from the multiplication of the multiplicand –1– and –2– components, and an accumulator connected to receive the RH components from the multiplication of the multiplicand –4– and –8– components, the multiplicand –2– component being the multiplicand component selected for multiplication at the one time, the –1– –4– –8– multiplicand components being those multiplied at another time.

9. A system as in claim 6 in which the multiplier register registers in decimal digits and the multiplicand register registers in a –1–, –2–, –4–, –8– bit code, and including an accumulator connected to receive the LH components, an accumulator connected to receive the RH components from the multiplication of the multiplicand –1– and –4– components, and an accumulator connected to receive the RH components from the multiplication of the multiplicand –2– and –8– components, the multiplicand –4– component being the multiplicand component selected for multiplication at the one time, the –1– –2– –8– multiplicand components being those multiplied at another time.

10. In a multiplying system, a pulse emitter for producing bit code pulses and a partial product matrix constituted by a plurality of multiplier plates to which the pulses are sent, a multiplier register for successively selecting a multiplier plate corresponding to each of the orders of the registered multiplier, a multiplicand register for filtering pulses from the selected multiplier plates and which registers the multiplicand in components code whereby each digit of the multiplicand may be indicated by more than one multiplicand component, a column shift commutator for controlling the successive selection of multiplier plates by the multiplier register, a column shift switch controlled by the column shift commutator for directing pulses from the multiplicand register into their proper order, a distributor controlled by the compute commutator for distributing pulses by bit value into separate accumulators, and means for avoiding conflict between potentially conflicting partial product pulses which might result from the simultaneous multiplication of two or more multiplicand components by the multiplier comprising a secondary commutator responsive to said pulse emitter for controlling said column shift commutator for effecting multiplication of selected of the multiplicand components by the multiplier at one time and two or more of the remaining multiplicand components by the multiplier simultaneously at another time, means for sending potentially conflicting partial product pulses resulting from the latter simultaneous multiplication to said separate accumulators, and means controlled by the column shift commutator and by the pulse emitter for collecting all the components in the accumulators in one of them.

11. A system as in claim 10 in which the multiplier register registers in decimal digits and the multiplicand register registers in a –1–, –2–, –4–, –8– bit code, and including an accumulator connected to receive the LH components, an accumulator connected to receive selected of the RH components, and an accumulator connected to receive the remaining RH components, one of the multiplicand –2– and –4– components being the multiplicand components selected for the multiplication at the one time, all remaining of the –1– –2– –4– –8– multiplicand components being those multiplied at another time.

12. A system as in claim 10 in which the multiplier register registers in decimal digits and the multiplicand register registers in a –1–, –2–, –4–, –8– bit code, and including an accumulator connected to receive the LH components, an accumulator connected to receive the RH components resulting from the multiplication of the multiplicand –1– and –2– components by the multiplier, and an accumulator connected to receive RH components resulting from the multiplication of the multiplicand –4– and –8– components by the multiplier, the multiplicand –2– components being the multiplicand components selected for multiplication at the one time, the –1– –4– –8– multiplicand components being those multiplied at another time.

13. A system as in claim 10 in which the multiplier register registers in decimal digits and the multiplicand register registers in a –1–, –2–, –4–, –8– bit code, and including an accumulator connected to receive the LH components, an accumulator connected to receive the RH components resulting from the multiplication of the multiplicand –1– and –4– components by the multiplicand, and an accumulator connected to receive RH components resulting from the multiplication of the multiplicand –2– and –8– components by the multiplier, the multiplicand –4– components being the components selected for multiplication at the time, the –1– –2– –8– multiplicand components being those multiplied at another time.

14. In a multiplying system, a pulse emitter for cyclically producing a series of electric bit code pulses each of different value and a selectable multiplier plate in a partial product matrix for each multiplier digit which when selected passes to the multiplicand register those pulses necessary to represent the LH and RH partial products of the corresponding multiplier digit by all possible multiplicand quantities, a multiplier register comprising counter tubes which register the multiplier and select the multiplier plate corresponding to the digit of the registered multiplier, a multiplicand register comprising counter tubes and LH and RH gates controlled thereby for passing those pulses from the selected multiplier plates necessary to represent the partial products of the registered multiplier digit by the registered multiplicand, the multiplicand counter tubes registering the multiplicand in components code whereby each digit of the multiplicand may be indicated by more than one multiplicand component, and means for avoiding conflict between potentially conflicting partial product pulses which might result from the simultaneous multiplication of two or more multiplicand components by the multiplicand comprising means for selectively activating the gates to effect multiplication of selected of the multiplicand components by the multiplier at one time and two or more of the remaining multiplicand components by the multiplier simultaneously at another time, and means for sending potentially conflicting partial product pulses from the gates resulting from the latter simultaneous multiplication to separate accumulators.

15. A system as in claim 14 in which the multiplier register registers in decimal digits and the multiplicand register registers in a –1–, –2–, –4–, –8– bit code, and including an accumulator connected to receive the LH components, an accumulator connected to receive selected of the RH components, and an accumulator connected to receive the remaining RH components, one of the multiplicand –2– and –4– components being the multiplicand components selected for multiplication at the one time, all remaining of the –1– –2– –4– –8– multiplicand components being those multiplied at another time.

16. A system as in claim 14 in which the multiplier register registers in decimal digits and the multiplicand register registers in a –1–, –2–, –4–, –8– bit code, and including an accumulator connected to receive the LH components, an accumulator connected to receive the RH components resulting from the multiplication of the multiplicand –1– and –2– components by the multiplier, and an accumulator connected to receive RH components resulting from the multiplication of the multiplicand –4– and –8– components by the multiplier, the multiplicand –2– components being the multiplicand components selected for multiplication at the one time, the –1– –4– –8– multiplicand components being those multiplied at another time.

17. A system as in claim 14 in which the multiplier register registers in decimal digits and the multiplicand register registers in a –1–, –2–, –4–, –8– bit code, and including an accumulator connected to receive the LH components, an accumulator connected to receive the RH components resulting from the multiplication of the multiplicand –1– and –4– components by the multiplier, and an accumulator connected to receive RH components resulting from the multiplication of the multiplicand –2– and –8– components by the multiplier, the multiplicand –4– component being the multiplicand component selected for multiplication at the one time, the –1– –2– –8– multiplicand components being those multiplied at another time.

18. In a multiplying system, a pulse emitter for cyclically producing a series of electric bit code pulses each of different value and a selectable multiplier plate in a partial product matrix for each multiplier digit which when selected passes to the multiplicand register those pulses necessary to represent the LH and RH partial products of the corresponding multiplier digit by all possible multiplicand quantities, a multiplier register comprising counter tubes which register the multiplier and select the multiplier plate corresponding to the digit of the registered multiplier, a multiplicand register comprising counter tubes and LH and RH gates controlled thereby for passing those pulses from the selected multiplier plates necessary to represent the partial products of the registered multiplier digit by the registered multiplicand, the multiplicand counter tubes registering the multiplicand in components code whereby each digit of the multiplicand may be indicated by more than one multiplicand component, and means for avoiding conflict between potentially conflicting partial product pulses which might result from the simultaneous multiplication of two or more multiplicand components by the multiplier comprising a secondary commutator controlled by the pulse emitter for selectively activating the gates to effect multiplication of selected of the multiplicand components by the multiplier at one time and two or more of the remaining multiplicand components by the multiplier simultaneously at another time, and means for sending potentially conflicting partial product pulses from the gates resulting from the latter simultaneous multiplication to separate accumulators.

19. A system as in claim 18 in which the multiplier register registers in decimal digits and the multiplicand register registers in a –1–, –2–, –4–, –8– bit code, and including an accumulator connected to receive the LH components, an accumulator connected to receive selected of the RH components, and an accumulator connected to receive the remaining RH components, one of the multiplicand –2– and –4– components being the multiplicand components selected for multiplication at the one time, all remaining of the –1– –2– –4– –8– multiplicand components being those multiplied at another time.

20. A system as in claim 18 in which the multiplier register registers in decimal digits and the multiplicand register registers in a −1−, −2−, −4−, −8− bit code, and including an accumulator connected to receive the LH components, an accumulator connected to receive the RH components resulting from the multiplication of the multiplicand −1− and −2− components by the multiplier, and an accumulator connected to receive RH components resulting from the multiplication of the multiplicand −4− and −8− components by the multiplier, the multiplicand −2− components being the multiplicand components selected for multiplication at the one time, the −1− −4− −8− and multiplicand components being those multiplied at another time.

21. A system as in claim 18 in which the multiplier register registers in decimal digits and the multiplicand register registers in a −1−, −2−, −4−, −8− bit code, and including an accumulator connected to receive the LH components, an accumulator connected to receive the RH components, resulting from the multiplication of the multiplicand −1− and −2− components by the multiplier, and an accumulator connected to receive RH components resulting from the multiplication of the multiplicand −2− and −8− components by the multiplier, the multiplicand −4− component being the multiplicand component selected for multiplication at the one time, the −1− −2− −8− multiplicand components being those multiplied at another time.

22. In a multiplying system, a pulse emitter for cyclically producing a series of electric bit code pulses each of different value and a selectable multiplier plate in a partial product matrix for each multiplier digit which when selected passes to the multiplicand register those pulses necessary to represent the LH and RH partial products of the corresponding multiplier digit by all possible multiplicand quantities, a multiplier register comprising counter tubes which register the multiplier and select successively for each multiplier order the multiplier plate corresponding to the digit in each of the orders of the registered multiplier, a multiplicand register comprising counter tubes and LH and RH gates controlled thereby for passing those pulses from the selected multiplier plates necessary to represent the partial products of the registered multiplier digit by the registered multiplicand, the multiplicand counter tubes registering the multiplicand in components code whereby the multiplicand may be indicated by more than one multiplicand component, a column shift commutator controlled by a secondary commutator for controlling the successive selection of multiplier plates by the multiplier register, a colum shift switch receiving the output of the gates and controlled by the column shift commutator for directing pulses from the multiplicand register into their proper order, and means for avoiding conflict between potentially conflicting partial product pulses which might result from the simultaneous multiplication of two or more multiplicand components by the multiplier comprising said secondary commutator controlled by the pulse emitter for selectively activating the gates to effect multiplication of selected of the multiplicand components by the multiplier at one time and two or more of the remaining multiplicand components by the multiplier simultaneously at another time, and means for sending potentially conflicting partial product pulses from the gates resulting from the latter simultaneous multiplication to separate accumulators.

23. A system as in claim 22 in which the multiplier register registers in decimal digits and the multiplicand register registers in a −1−, −2−, −4−, −8− bit code, and including an accumulator connected to receive the LH components, an accumulator connected to receive selected of the RH components, and an accumulator connected to receive the remaining RH components, one of the multiplicand −2− and −4− components being the multiplicand components selected for multiplication at the one time, all remaining of the −1−, −2−, −4−, −8− multiplicand components being those multiplied at another time.

24. A system as in claim 22 in which the multiplier register registers in decimal digits and the multiplicand register registers in a −1−, −2−, −4−, −8− bit code, and including an accumulator connected to receive the LH components, an accumulator connected to receive the RH components resulting from the multiplication of the multiplicand −1− and −2− components by the multiplier, and an accumulator connected to receive RH components resulting from the multiplication of the multiplicand −4− and −8− components by the multiplier, the multiplicand −2− components being the multiplicand components selected for multiplication at the one time, the −1− −4− −8− multiplicand components being those multiplied at another time.

25. A system as in claim 22 in which the multiplier register registers in decimal digits and the multiplicand register registers in a −1−, −2−, −4−, −8− bit code, and including an accumulator connected to receive the LH components, an accumulator connected to receive the RH components resulting from the multiplication of the multiplicand −1− and −4− components by the multiplier, and an accumulator connected to receive RH components resulting from the multiplication of the multiplicand −2− and −8− components by the multiplier, the multiplicand −4− component being the multiplicand component selected for multiplication at the one time, the −1− −2− −8− multiplicand components being those multiplied at another time.

26. In a multiplying system, a pulse emitter for cyclically producing a series of electric bit code pulses each of different value and a selectable multiplier plate in a partial product matrix for each multiplier digit which when selected passes to the multiplicand register those pulses necessary to represent the LH and RH partial products of the corresponding multiplier digit by all possible multiplicand quantities, a multiplier register comprising counter tubes which register the multiplier and select successively for each multiplier order the multiplier plate corresponding to the digit in each of the orders of the registered multiplier, a multiplicand register comprising counter tubes and LH and RH gates controlled thereby for passing those pulses from the selected multiplier plates necessary to represent the partial products of the registered multiplier digit by the registered multiplicand, the multiplicand counter tubes registering the multiplicand in components code whereby the multiplicand may be indicated by more than one multiplicand component, a column shift commutator controlled by a secondary commutator for controlling the successive selection of multiplier plates by the multiplier register, a column shift switch receiving the output of the gates and controlled by the column shift commutator for directing pulses from the multiplicand register into their proper order, a distributor controlled by the pulse emitter for distributing pulses by bit value into separate accumulators, and means for avoiding conflict between potentially conflicting partial product pulses which might result from the simultaneous multiplication of two or more multiplicand components by the multiplier comprising said secondary commutator controlled by the pulse emitter for selectively activating the gates to effect multiplication of selected of the multiplicand components by the multiplier at one time and two or more of the remaining multiplicand components by the multiplier simultaneously at another time, means for sending potentially conflicting partial product pulses from the gates resulting from the latter simultaneous multiplication to said separate accumulators, and means controlled by the column shift commutator and by the pulse emitter for collecting all the components in the accumulators in one of them.

27. A system as in claim 26 in which the multiplier register registers in decimal digits and the multiplicand register registers in a −1−, −2−, −4−, −8− bit code, and including an accumulator connected to receive the LH components, an accumulator connected to receive selected of the RH components, and an accumulator connected to receive the remaining RH components, one of the multiplicand -2- and -4- components being the multiplicand components selected for multiplication at the one time, all remaining of the -1- -2- -4- -8- multiplicand components being those multiplied at another time.

28. A system as in claim 26 in which the multiplier register registers in decimal digits and the multiplicand register registers in a -1-, -2-, -4-, -8- bit code, and including an accumulator connected to receive the LH components, an accumulator connected to receive the RH components resulting from the multiplication of the multiplicand -1- and -2- components by the multiplier, and an accumulator connected to receive RH components resulting from the multiplication of the multiplicand -4- and -8- components by the multiplier, the multiplicand -2- component being the multiplicand component selected for multiplication at the one time, the -1- -4- -8- multiplicand components being those multiplied at another time.

29. A system as in claim 26 in which the multiplier register registers in decimal digits and the multiplicand register registers in a -1-, -2-, -4-, -8- bit code, and including an accumulator connected to receive the LH components, an accumulator connected to receive the RH components resulting from the multiplication of the multiplicand -1- and -4- components by the multiplier, and an accumulator connected to receive RH components resulting from the multiplication of the multiplicand -2- and -8- components by the multiplier, the multiplicand -4- component being the multiplicand component selected for multiplication at the one time, the -1- -2- -8- multiplicand components being those multiplied at another time.

30. In a multiplying system of the type in which bit code pulses from a pulse emitter are sent through a multiplier plate in a partial product matrix selected by a multiplier register and filtered through a multiplicand register to accumulators which accumulate partial products in terms of the code, a multiplicand register which registers the multiplicand in components code whereby the multiplicand may be indicated by more than one multiplicand component, and means for avoiding conflict between potentially conflicting partial product pulses which might result from the simultaneous multiplication of two or more multiplicand components by the multiplier comprising means for multiplying selected of the multiplicand components by the multiplier at different times from the remaining multiplicand components, and means for multiplying two or more of the remaining multiplicand components by the multiplier simultaneously together with means for sending potentially conflicting partial product pulses resulting from the latter simultaneous multiplication to separate accumulators, said system including a multiplier register which registers in decimal digits and in which the multiplicand register registers in a -1-, -2-, -4-, -8- bit code, and including an accumulator connected to receive the LH components, an accumulator connected to receive selected of the RH components, and an accumulator connected to receive the remaining RH components, one of the multiplicand -2- and -4- components being multiplied at a different time from the remaining multiplicand components.

31. In a multiplying system of the type in which bit code pulses from a pulse emitter are sent through a multiplier plate in a partial product matrix selected by a multiplier register and filtered through a multiplicand register to accumulators which accumulate partial products in terms of the code, a multiplicand register which registers the multiplicand in components code whereby the multiplicand may be indicated by more than one multiplicand component, and means for avoiding conflict between potentially conflicting partial product pulses which might result from the simultaneous multiplication of two or more multiplicand components by the multiplier comprising means for multiplying selected of the multiplicand components by the multiplier at different times from the remaining multiplicand components, and means for multiplying two or more of the remaining multiplicand components by the multiplier simultaneously together with means for sending potentially conflicting partial product pulses resulting from the latter simultaneous multiplication to separate accumulators, said system including a multiplier register which registers in decimal digits and in which the multiplicand register registers in a -1-, -2-, -4-, -8- bit code, and including an accumulator connected to receive the LH components, an accumulator connected to receive the RH components from the multiplication of the multiplicand -1- and -2- components, and an accumulator connected to receive the RH components from the multiplication of the multiplicand -4- and -8- components, the multiplicand -2- components being multiplied at a different time from the remaining multiplicand components.

32. In a multiplying system of the type in which bit code pulses from a pulse emitter are sent through a multiplier plate in a partial product matrix selected by a multiplier register and filtered through a multiplicand register to accumulators which accumulate partial products in terms of the code, a multiplicand register which registers the multiplicand in components code whereby the multiplicand may be indicated by more than one multiplicand component, and means for avoiding conflict between potentially conflicting partial product pulses which might result from the simultaneous multiplication of two or more multiplicand components by the multiplier comprising means for multiplying selected of the multiplicand components by the multiplier at different times from the remaining multiplicand components, and means for multiplying two or more of the remaining multiplicand components by the multiplier simultaneously together with means for sending potentially conflicting partial product pulses resulting from the latter simultaneous multiplication to separate accumulators, the multiplier register registering in decimal digits and the multiplicand register registering in a -1-, -2-, -4-, -8- bit code, and including an accumulator connected to receive the LH components, an accumulator connected to receive the RH components from the multiplication of the multiplicand -1- and -4- components and an accumulator connected to receive the RH components from the multiplication of the multiplicand -2- and -8- components, the multiplicand -4- components being multiplied at a different time from the remaining multiplicand components.

References Cited in the file of this patent

UNITED STATES PATENTS

| | | |
|---|---|---|
| 2,344,885 | Kozma et al. | Mar. 21, 1944 |
| 2,394,924 | Luhn | Feb. 12, 1946 |
| 2,404,047 | Flory et al. | July 16, 1946 |
| 2,490,362 | Lake et al. | Dec. 6, 1949 |

FOREIGN PATENTS

| | | |
|---|---|---|
| 706,457 | Great Britain | Mar. 31, 1954 |

U. S. DEPARTMENT OF COMMERCE
PATENT OFFICE

CERTIFICATE OF CORRECTION

Patent No. 2,829,827     Carl A. Bergfors      April 8, 1958

It is hereby certified that error appears in the printed specification of the above numbered patent requiring correction and that the said Letters Patent should read as corrected below.

Column 2, line 65, for "first of which" read -- first four of which --; column 3, line 52, for "similtaneously" read -- simultaneously --; column 4, in the heading under "CHART A", line 2, before "MC binary" insert -- and -- in italics; column 5, line 20, before "one" insert -- of --; column 7, line 17, for "order to" read -- order of --; line 52, for "tiode" read -- triode --; column 14, line 55, for "its" read -- it --.

Signed and sealed this 29th day of July 1958.

(SEAL)
Attest:

KARL H. AXLINE
Attesting Officer

ROBERT C. WATSON
Commissioner of Patents